United States Patent
Chen et al.

(10) Patent No.: US 10,262,400 B2
(45) Date of Patent: Apr. 16, 2019

(54) IMAGE PROCESSING METHOD AND DEVICE USING REPROJECTION ERROR VALUES

(71) Applicant: Huawei Technologies Co., Ltd., Shenzhen (CN)

(72) Inventors: Gang Chen, Beijing (CN); Zhongwei Tang, Shanghai (CN); Wei Luo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/522,930

(22) PCT Filed: Oct. 31, 2014

(86) PCT No.: PCT/CN2014/090094
§ 371 (c)(1),
(2) Date: Apr. 28, 2017

(87) PCT Pub. No.: WO2016/065632
PCT Pub. Date: May 6, 2016

(65) Prior Publication Data
US 2017/0330308 A1    Nov. 16, 2017

(51) Int. Cl.
*G06K 9/00* (2006.01)
*G06T 5/00* (2006.01)
*H04N 5/357* (2011.01)

(52) U.S. Cl.
CPC .............. *G06T 5/002* (2013.01); *G06T 5/006* (2013.01); *H04N 5/3572* (2013.01)

(58) Field of Classification Search
CPC .......... G06T 5/002; G06T 5/50; G06T 5/006; G06T 3/4053; G06T 3/20; H04N 5/23238;
(Continued)

(56) References Cited

U.S. PATENT DOCUMENTS 6,819,333 B1 * 11/2004 Sadowski ............. G06T 3/0093
345/606
2004/0218803 A1    11/2004 Chanas et al.
(Continued)

FOREIGN PATENT DOCUMENTS

CN    102075785 A    5/2011
CN    102169573 A    8/2011
(Continued)

OTHER PUBLICATIONS

Machine Translation and Abstract of Chinese Publication No. CN102075785, May 25, 2011, 9 pages.
(Continued)

*Primary Examiner* — Amir Alavi
(74) *Attorney, Agent, or Firm* — Conley Rose, P.C.

(57) ABSTRACT

The present disclosure discloses an image processing method including acquiring a distorted image of a photographed object; selecting according to a mapping relationship between at least one group of lens optical distortion models and reprojection error values, a lens optical distortion model whose reprojection error value is less than a specified threshold; and correcting, by using the lens optical distortion model, an optical distortion of the acquired distorted image, and obtaining an image with the optical distortion corrected disclosure.

20 Claims, 5 Drawing Sheets

(58) Field of Classification Search
CPC .... H04N 5/23232; H04N 5/265; H04N 5/247; H04N 5/2621; H04N 5/211
See application file for complete search history.

(56) References Cited

U.S. PATENT DOCUMENTS

| | | | |
|---|---|---|---|
| 2004/0247195 | A1 | 12/2004 | Chauville et al. |
| 2005/0002586 | A1 | 1/2005 | Liege et al. |
| 2005/0007652 | A1* | 1/2005 | Winkler ............... G09G 3/3433 359/298 |
| 2005/0265630 | A1* | 12/2005 | Fukuhara ............. G06T 3/0018 382/276 |
| 2007/0248281 | A1 | 10/2007 | Super et al. |
| 2008/0239107 | A1 | 10/2008 | Cho |
| 2009/0059041 | A1 | 3/2009 | Kwon |
| 2014/0285676 | A1 | 9/2014 | Barreto et al. |
| 2015/0093042 | A1 | 4/2015 | Zhu et al. |
| 2016/0307300 | A1* | 10/2016 | Chen ........................ G06T 3/20 |
| 2017/0330308 | A1* | 11/2017 | Chen ....................... G06T 5/006 |
| 2018/0114298 | A1* | 4/2018 | Malaika .................. G06T 5/006 |
| 2018/0122055 | A1* | 5/2018 | Zhu ......................... G06T 5/006 |

FOREIGN PATENT DOCUMENTS

| | | |
|---|---|---|
| CN | 102622747 A | 8/2012 |
| CN | 102750697 A | 10/2012 |
| JP | 2011049733 A | 3/2011 |
| KR | 20040044187 A | 5/2004 |
| KR | 100879832 B1 | 1/2009 |
| KR | 20090021627 A | 3/2009 |

OTHER PUBLICATIONS

Machine Translation and Abstract of Chinese Publication No. CN102169573, Aug. 31, 2011, 20 pages.
Machine Translation and Abstract of Chinese Publication No. CN102622747, Aug. 1, 2012, 13 pages.
Zhang, Z., et al., "A Flexible New Technique for Camera Calibration," Technical Report, MSR-TR-98-71, Dec. 2, 1998, 22 pages.
Tsai, R., et al., "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.
Zhang, F., et al., "Distortion Correction Method Based on Image Plane," Computer Engineering, vol. 38, No. 22, Nov. 2012, 3 pages.
English Translation of Zhang, F., et al., "Distortion Correction Method Based on Image Plane," Computer Engineering, vol. 38, No. 22, Nov. 2012, 6 pages.
Meng, C., et al., "New Method for Geometric Calibration and Distortion Correction of Conventional C-arm," Elsevier, Computer in Biology and Medicine, vol. 52, 2014, pp. 49-56.
Foreign Communication From a Counterpart Application, Chinese Application No. 201480001341.9, Chinese Office Action dated May 31, 2016, 11 pages.
Foreign Communication From a Counterpart Application, European Application No. 14904981.9, Extended European Search Report dated Jul. 4, 2017, 12 pages.
Foreign Communication From a Counterpart Application, PCT Application No. PCT/CN2014/090094, English Translation of International Search Report dated Aug. 3, 2015, 2 pages.
Foreign Communication From a Counterpart Application, PCT Application No. PCT/CN2014/090094, English Translation of Written Opinion dated Aug. 3, 2015, 7 pages.
Machine Translation and Abstract of Korean Publication No. KR100879832, Jan. 22, 2009, 46 pages.
Foreign Communication From a Counterpart Application, Korean Application No. 10-2017-7012306, Korean Office Action dated Feb. 12, 2018, 6 pages.
Foreign Communication From a Counterpart Application, Korean Application No. 10-2017-7012306, English Translation of Korean Office Action dated Feb. 12, 2018, 4 pages.
Machine Translation and Abstract of Japanese Publication No. JP2011049733, Mar. 10, 2011, 27 pages.
Machine Translation and Abstract of Korean Publication No. KR20040044187, May 27, 2004, 50 pages.
Foreign Communication From a Counterpart Application, Korean Application No. 2018-057520936, Korean Notice of Allowance dated Aug. 23, 2018, 3 pages.

* cited by examiner

IMAGE PROCESSING METHOD AND DEVICE USING REPROJECTION ERROR VALUES

CROSS-REFERENCE TO RELATED APPLICATIONS

This application is a national stage of International Application No. PCT/CN2014/090094, filed on Oct. 31, 2014, which is hereby incorporated by reference in its entirety.

TECHNICAL FIELD

The present disclosure relates to the field of wireless communications technologies, and in particular, to an image processing method and device.

BACKGROUND

With fast development of smartphones and a mobile Internet, a terminal device (for example, a camcorder or a camera), as an interface for connecting a real world and a virtual network world, has become a very important component in a smartphone. Every day, thousands of people use photo shooting functions or photographing functions of smartphones to record new things related or unrelated to the people.

In large quantities of new things recorded by people, there are a relatively large proportion of facial images. However, in a process in which a terminal device converts facial features into a facial image by using principles of optics, an optical distortion easily occurs, causing a distortion of facial features in the obtained facial image. For example, a barrel distortion occurs, that is, in an actual application, if a terminal device uses a pantoscopic lens for capturing an image, a barrel distortion occurs in facial features in the captured image; or a pincushion distortion occurs, that is, in an actual application, if a terminal device uses a long-focus lens for capturing an image, a pincushion distortion occurs in facial features in the captured image. In other words, severity of a facial distortion affects quality of a facial image.

SUMMARY

In view of this, embodiments of the present disclosure provide an image processing method and device to solve an existing problem that quality of an image obtained by capture is low in some approaches.

According to a first aspect of the present disclosure, an image processing method is provided and includes: acquiring a distorted image of a photographed object; selecting, according to a mapping relationship between at least one group of lens optical distortion models and reprojection error values, a lens optical distortion model corresponding to a reprojection error value that is less than a specified threshold, where the lens optical distortion model includes an optical distortion type, a distortion order, and a distortion coefficient, and for a calibration object, the reprojection error value is used to represent a difference between theoretically distorted image coordinates of the calibration object and actually distorted image coordinates of the calibration object; and correcting, by using the lens optical distortion model, an optical distortion of the acquired distorted image, and obtaining an image with the optical distortion corrected.

With reference to a possible implementation manner of the first aspect of the present disclosure, in a first possible implementation manner, the correcting, by using the lens optical distortion model, an optical distortion of the acquired distorted image includes: determining ideal image coordinates of the photographed object corresponding to the acquired distorted image, where the ideal image coordinates are used to represent coordinates of the photographed object in an image without an optical distortion; performing coordinate conversion on the determined ideal image coordinates of the photographed object by using the lens optical distortion model, to obtain theoretically optically distorted image coordinates corresponding to the ideal image coordinates; searching, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold; and obtaining, by calculation according to a pixel value of the found pixel, a pixel value corresponding to the ideal image coordinates of the photographed object.

With reference to the first possible implementation manner of the first aspect of the present disclosure, in a second possible implementation manner, the determining ideal image coordinates of the photographed object corresponding to the acquired distorted image includes: creating a virtual grid image without an optical distortion, and mapping the photographed object to the grid image to obtain an ideal image of the photographed object; and determining ideal image coordinates of each grid point in the ideal image.

With reference to the second possible implementation manner of the first aspect of the present disclosure, in a third possible implementation manner, the performing coordinate conversion on the determined ideal image coordinates of the photographed object by using the lens optical distortion model, to obtain theoretically optically distorted image coordinates corresponding to the ideal image coordinates includes: reading an intrinsic matrix of a terminal device and an inverse matrix of the intrinsic matrix; and for the ideal image coordinates of each grid point in the ideal image, performing: selecting a grid point from the ideal image, and performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates.

With reference to the third possible implementation manner of the first aspect of the present disclosure, in a fourth possible implementation manner, the performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates includes: converting the ideal image coordinates of the selected grid point into first pinhole plane coordinates by using the inverse matrix of the intrinsic matrix of the terminal device; converting the first pinhole plane coordinates into distorted second pinhole plane coordinates by using the selected lens optical distortion model, where the distorted second pinhole plane coordinates are obtained after the first pinhole plane coordinates corresponding to the selected grid point undergo an optical distortion based on the selected lens optical distortion model; and converting the distorted second pinhole plane coordinates into the theoretically optically distorted image coordinates by using the intrinsic matrix of the terminal device.

With reference to the first possible implementation manner of the first aspect of the present disclosure, or with reference to the second possible implementation manner of the first aspect of the present disclosure, or with reference to the third possible implementation manner of the first aspect of the present disclosure, or with reference to the fourth possible implementation manner of the first aspect of the present disclosure, in a fifth possible implementation manner, the searching, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold includes: calculating a distance between the theoretically optically distorted image coordinates and actually optically distorted image coordinates of each pixel included in the acquired distorted image, and determining a corresponding pixel at which the distance obtained by calculation is less than the specified threshold.

With reference to the first possible implementation manner of the first aspect of the present disclosure, or with reference to the second possible implementation manner of the first aspect of the present disclosure, or with reference to the third possible implementation manner of the first aspect of the present disclosure, or with reference to the fourth possible implementation manner of the first aspect of the present disclosure, or with reference to the fifth possible implementation manner of the first aspect of the present disclosure, in a sixth possible implementation manner, the obtaining, by calculation according to a pixel value of the found pixel, a pixel value corresponding to the ideal image coordinates of the photographed object includes: performing interpolation calculation on the pixel value of the found pixel to obtain the pixel value of the ideal image coordinates of the photographed object in the ideal image.

With reference to the second possible implementation manner of the first aspect of the present disclosure, or with reference to the third possible implementation manner of the first aspect of the present disclosure, or with reference to the fourth possible implementation manner of the first aspect of the present disclosure, or with reference to the fifth possible implementation manner of the first aspect of the present disclosure, or with reference to the sixth possible implementation manner of the first aspect of the present disclosure, in a seventh possible implementation manner, the obtaining an image with the optical distortion corrected includes: when obtaining a pixel value of each grid point in the ideal image, using the obtained ideal image as the image with the optical distortion of the acquired distorted image corrected.

With reference to the possible implementation manner of the first aspect of the present disclosure, or with reference to the first possible implementation manner of the first aspect of the present disclosure, or with reference to the second possible implementation manner of the first aspect of the present disclosure, or with reference to the third possible implementation manner of the first aspect of the present disclosure, or with reference to the fourth possible implementation manner of the first aspect of the present disclosure, or with reference to the fifth possible implementation manner of the first aspect of the present disclosure, or with reference to the sixth possible implementation manner of the first aspect of the present disclosure, or with reference to the seventh possible implementation manner of the first aspect of the present disclosure, in an eighth possible implementation manner, a mapping relationship between the lens optical distortion model and the reprojection error value includes: selecting a calibration object for a lens optical distortion model; mapping the calibration object to a grid image to obtain ideal image coordinates of the calibration object; converting the obtained ideal image coordinates of the calibration object into theoretically distorted image coordinates by using the lens optical distortion model; mapping the calibration object to an image sensor by using an imaging function of an optical imaging device, to obtain an optically distorted image, and determining actually distorted image coordinates of a pixel in the optically distorted image; determining, according to a difference between the theoretically distorted image coordinates and the actually distorted image coordinates, a reprojection error value corresponding to the lens optical distortion model; and establishing a mapping relationship between the lens optical distortion model and the determined reprojection error value.

With reference to the possible implementation manner of the first aspect of the present disclosure, or with reference to the first possible implementation manner of the first aspect of the present disclosure, or with reference to the second possible implementation manner of the first aspect of the present disclosure, or with reference to the third possible implementation manner of the first aspect of the present disclosure, or with reference to the fourth possible implementation manner of the first aspect of the present disclosure, or with reference to the fifth possible implementation manner of the first aspect of the present disclosure, or with reference to the sixth possible implementation manner of the first aspect of the present disclosure, or with reference to the seventh possible implementation manner of the first aspect of the present disclosure, or with reference to the eighth possible implementation manner of the first aspect of the present disclosure, in a ninth possible implementation manner, when obtaining the image with the optical distortion corrected, the method further includes: when determining that a specified object is included in the acquired distorted image, determining intensity and a direction of a regional distortion of the specified object in the acquired distorted image; selecting a regional distortion correction parameter according to the determined intensity and the direction of the regional distortion of the specified object; and correcting, by using the selected regional distortion correction parameter, the regional distortion of the image with the optical distortion corrected, to obtain an image with the regional distortion corrected.

With reference to the ninth possible implementation manner of the first aspect of the present disclosure, in a tenth possible implementation manner, the determining intensity and a direction of a regional distortion of the specified object in the acquired distorted image includes: determining a first position coordinate set of the specified object in the acquired distorted image, and determining a second position coordinate set of the specified object in the image with the optical distortion corrected; for at least one pixel in the specified object, respectively determining coordinates of the at least one pixel in the first position coordinate set and coordinates of the at least one pixel in the second position coordinate set; and determining the intensity and the direction of the regional distortion of the specified object in the acquired distorted image according to the coordinates of the at least one pixel in the first position coordinate set and the coordinates of the at least one pixel in the second position coordinate set.

With reference to the ninth possible implementation manner of the first aspect of the present disclosure, or with reference to the tenth possible implementation manner of the first aspect of the present disclosure, in an eleventh possible implementation manner, the correcting, by using the selected regional distortion correction parameter, the regional distortion of the image with the optical distortion corrected, to obtain an image with the regional distortion corrected includes: correcting, by using the selected regional distortion correction parameter, coordinates of each pixel included in the first position coordinate set; determining a conversion rule between coordinates of pixels of the specified object in the corrected first position coordinate set and coordinates of the pixels in the second position coordinate set according to the corrected first position coordinate set and the second position coordinate set; and correcting, by using the determined conversion rule, the regional distortion of the image with the optical distortion corrected, to obtain the image with the regional distortion corrected.

With reference to the eleventh possible implementation manner of the first aspect of the present disclosure, in a twelfth possible implementation manner, the correcting, by using the determined conversion rule, the regional distortion of the image with the optical distortion corrected includes: creating, according to the image with the optical distortion corrected, a virtual grid image with the regional distortion corrected, where a quantity of grid points included in the grid image with the regional distortion corrected is the same as a quantity of pixels included in the image with the optical distortion corrected, and coordinates of a grid point and coordinates of a pixel in a same position are the same; and for each grid point in the grid image, performing the following operations: selecting a grid point from the grid image, and converting coordinates of the grid point into regionally distorted coordinates by using the determined conversion rule; searching, according to the regionally distorted coordinates and coordinates of the pixels included in the image with the optical distortion corrected, for a pixel at which a distance between coordinates and the regionally distorted coordinates is less than a specified distance; and obtaining a pixel value of the selected grid point in the grid image by calculation according to a pixel value of the found pixel.

According to a second aspect of the present disclosure, an image processing device is provided, where the image processing device includes an imaging device, an image sensor, and a processor, where the image sensor is connected to the processor by a bus; the imaging device is configured to map a photographed object to the image sensor; the image sensor is configured to acquire a distorted image of the photographed object; and the processor is configured to select, according to a mapping relationship between at least one group of lens optical distortion models and reprojection error values, a lens optical distortion model whose reprojection error value is less than a specified threshold, where the lens optical distortion model includes an optical distortion type, a distortion order, and a distortion coefficient, and for a calibration object, the reprojection error value is used to represent a difference between theoretically distorted image coordinates of the calibration object and actually distorted image coordinates of the calibration object; and correct, by using the lens optical distortion model, an optical distortion of the distorted image acquired by the image sensor, and obtain an image with the optical distortion corrected.

With reference to a possible implementation manner of the second aspect of the present disclosure, in a first possible implementation manner, when correcting, by using the lens optical distortion model, the optical distortion of the acquired distorted image, the processor is configured to: determine ideal image coordinates of the photographed object corresponding to the acquired distorted image, where the ideal image coordinates are used to represent coordinates of the photographed object in an image without an optical distortion; perform coordinate conversion on the determined ideal image coordinates of the photographed object by using the lens optical distortion model, to obtain theoretically optically distorted image coordinates corresponding to the ideal image coordinates; search, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold; and obtain, by calculation according to a pixel value of the found pixel, a pixel value corresponding to the ideal image coordinates of the photographed object.

With reference to the first possible implementation manner of the second aspect of the present disclosure, in a second possible implementation manner, when determining the ideal image coordinates of the photographed object corresponding to the acquired distorted image, the processor is configured to: create a virtual grid image without an optical distortion, and map the photographed object to the grid image to obtain an ideal image of the photographed object; and determine ideal image coordinates of each grid point in the ideal image.

With reference to the second possible implementation manner of the second aspect of the present disclosure, in a third possible implementation manner, when performing coordinate conversion on the determined ideal image coordinates of the photographed object by using the lens optical distortion model, to obtain the theoretically optically distorted image coordinates corresponding to the ideal image coordinates, the processor is specifically configured to: read an intrinsic matrix of a terminal device and an inverse matrix of the intrinsic matrix; and for the ideal image coordinates of each grid point in the ideal image, perform: selecting a grid point from the ideal image, and performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates.

With reference to the third possible implementation manner of the second aspect of the present disclosure, in a fourth possible implementation manner, when performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates, the processor is configured to: convert the ideal image coordinates of the selected grid point into first pinhole plane coordinates by using the inverse matrix of the intrinsic matrix of the terminal device; convert the first pinhole plane coordinates into distorted second pinhole plane coordinates by using the selected lens optical distortion model, where the distorted second pinhole plane coordinates are obtained after the first pinhole plane coordinates corresponding to the selected grid point undergo an optical distortion based on the selected lens optical distortion model; and convert the distorted second pinhole plane coordinates into the theoretically optically distorted image coordinates by using the intrinsic matrix of the terminal device.

With reference to the first possible implementation manner of the second aspect of the present disclosure, or with reference to the second possible implementation manner of the second aspect of the present disclosure, or with reference to the third possible implementation manner of the second aspect of the present disclosure, or with reference to the fourth possible implementation manner of the second aspect of the present disclosure, in a fifth possible implementation manner, when searching, according to the theoretically optically distorted image coordinates and the actually optically distorted image coordinates of the pixels included in the acquired distorted image, for the pixel at which the distance between the actually optically distorted image coordinates and the theoretically optically distorted image coordinates is less than the specified threshold, the processor is configured to: calculate a distance between the theoretically optically distorted image coordinates and actually optically distorted image coordinates of each pixel included in the acquired distorted image, and determine a corresponding pixel at which the distance obtained by calculation is less than the specified threshold.

With reference to the first possible implementation manner of the second aspect of the present disclosure, or with reference to the second possible implementation manner of the second aspect of the present disclosure, or with reference to the third possible implementation manner of the second aspect of the present disclosure, or with reference to the fourth possible implementation manner of the second aspect of the present disclosure, or with reference to the fifth possible implementation manner of the second aspect of the present disclosure, in a sixth possible implementation manner, when obtaining, by calculation according to the pixel value of the found pixel, the pixel value corresponding to the ideal image coordinates of the photographed object, the processor is specifically configured to: perform interpolation calculation on the pixel value of the found pixel to obtain the pixel value of the ideal image coordinates of the photographed object in the ideal image.

With reference to the second possible implementation manner of the second aspect of the present disclosure, or with reference to the third possible implementation manner of the second aspect of the present disclosure, or with reference to the fourth possible implementation manner of the second aspect of the present disclosure, or with reference to the fifth possible implementation manner of the second aspect of the present disclosure, or with reference to the sixth possible implementation manner of the second aspect of the present disclosure, in a seventh possible implementation manner, the processor is configured to: when obtaining a pixel value of each grid point in the ideal image, use the obtained ideal image as the image with the optical distortion of the acquired distorted image corrected.

With reference to the possible implementation manner of the second aspect of the present disclosure, or with reference to the first possible implementation manner of the second aspect of the present disclosure, or with reference to the second possible implementation manner of the second aspect of the present disclosure, or with reference to the third possible implementation manner of the second aspect of the present disclosure, or with reference to the fourth possible implementation manner of the second aspect of the present disclosure, or with reference to the fifth possible implementation manner of the second aspect of the present disclosure, or with reference to the sixth possible implementation manner of the second aspect of the present disclosure, or with reference to the seventh possible implementation manner of the second aspect of the present disclosure, in an eighth possible implementation manner, a mapping relationship between the lens optical distortion model and the reprojection error value includes: selecting a calibration object for a lens optical distortion model; mapping the calibration object to a grid image to obtain ideal image coordinates of the calibration object; converting the obtained ideal image coordinates of the calibration object into theoretically distorted image coordinates by using the lens optical distortion model; mapping the calibration object to the image sensor by using an imaging function of an optical imaging device, to obtain an optically distorted image, and determining actually distorted image coordinates of a pixel in the optically distorted image; determining, according to a difference between the theoretically distorted image coordinates and the actually distorted image coordinates, a reprojection error value corresponding to the lens optical distortion model; and establishing a mapping relationship between the lens optical distortion model and the determined reprojection error value.

With reference to the possible implementation manner of the second aspect of the present disclosure, or with reference to the first possible implementation manner of the second aspect of the present disclosure, or with reference to the second possible implementation manner of the second aspect of the present disclosure, or with reference to the third possible implementation manner of the second aspect of the present disclosure, or with reference to the fourth possible implementation manner of the second aspect of the present disclosure, or with reference to the fifth possible implementation manner of the second aspect of the present disclosure, or with reference to the sixth possible implementation manner of the second aspect of the present disclosure, or with reference to the seventh possible implementation manner of the second aspect of the present disclosure, or with reference to the eighth possible implementation manner of the second aspect of the present disclosure, in a ninth possible implementation manner, when obtaining the image with the optical distortion corrected, the processor is further configured to: when determining that a specified object is included in the acquired distorted image, determine intensity and a direction of a regional distortion of the specified object in the acquired distorted image; select a regional distortion correction parameter according to the determined intensity and the direction of the regional distortion of the specified object; and correct, by using the selected regional distortion correction parameter, the regional distortion of the image with the optical distortion corrected, to obtain an image with the regional distortion corrected.

With reference to the ninth possible implementation manner of the second aspect of the present disclosure, in a tenth possible implementation manner, when determining the intensity and the direction of the regional distortion of the specified object in the acquired distorted image, the processor is configured to: determine a first position coordinate set of the specified object in the acquired distorted image, and determine a second position coordinate set of the specified object in the image with the optical distortion corrected; for at least one pixel in the specified object, respectively determine coordinates of the at least one pixel in the first position coordinate set and coordinates of the at least one pixel in the second position coordinate set; and determine the intensity and the direction of the regional distortion of the specified object in the acquired distorted image according to the coordinates of the at least one pixel in the first position coordinate set and the coordinates of the at least one pixel in the second position coordinate set.

With reference to the ninth possible implementation manner of the second aspect of the present disclosure, or with reference to the tenth possible implementation manner of the second aspect of the present disclosure, in an eleventh possible implementation manner, when correcting, by using the selected regional distortion correction parameter, the regional distortion of the image with the optical distortion corrected, to obtain the image with the regional distortion corrected, the processor is configured to: correct, by using the selected regional distortion correction parameter, coordinates of each pixel included in the first position coordinate set; determine a conversion rule between coordinates of pixels of the specified object in the corrected first position coordinate set and coordinates of the pixels in the second position coordinate set according to the corrected first position coordinate set and the second position coordinate set; and correct, by using the determined conversion rule, the regional distortion of the image with the optical distortion corrected, to obtain the image with the regional distortion corrected.

With reference to the eleventh possible implementation manner of the second aspect of the present disclosure, in a twelfth possible implementation manner, when correcting, by using the determined conversion rule, the regional distortion of the image with the optical distortion corrected, the processor is configured to: create, according to the image with the optical distortion corrected, a virtual grid image with the regional distortion corrected, where a quantity of grid points included in the grid image with the regional distortion corrected is the same as a quantity of pixels included in the image with the optical distortion corrected, and coordinates of a grid point and coordinates of a pixel in a same position are the same; and for each grid point in the grid image, perform the following operations: selecting a grid point from the grid image, and converting coordinates of the grid point into regionally distorted coordinates by using the determined conversion rule; searching, according to the regionally distorted coordinates and coordinates of the pixels included in the image with the optical distortion corrected, for a pixel at which a distance between coordinates and the regionally distorted coordinates is less than a specified distance; and obtaining a pixel value of the selected grid point in the grid image by calculation according to a pixel value of the found pixel.

According to a third aspect of the present disclosure, an image processing device is provided and includes: an acquiring module configured to acquire a distorted image of a photographed object; a selecting module configured to select, according to a mapping relationship between at least one group of lens optical distortion models and reprojection error values, a lens optical distortion model whose reprojection error value is less than a specified threshold, where the lens optical distortion model includes an optical distortion type, a distortion order, and a distortion coefficient, and for a calibration object, the reprojection error value is used to represent a difference between theoretically distorted image coordinates of the calibration object and actually distorted image coordinates of the calibration object; and a processing module configured to correct an optical distortion of the acquired distorted image by using the lens optical distortion model and obtain an image with the optical distortion corrected.

With reference to a possible implementation manner of the third aspect of the present disclosure, in a first possible implementation manner, when correcting, by using the lens optical distortion model, the optical distortion of the acquired distorted image, the processing module is specifically configured to: determine ideal image coordinates of the photographed object corresponding to the acquired distorted image, where the ideal image coordinates are used to represent coordinates of the photographed object in an image without an optical distortion; perform coordinate conversion on the determined ideal image coordinates of the photographed object by using the lens optical distortion model, to obtain theoretically optically distorted image coordinates corresponding to the ideal image coordinates; search, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold; and obtain, by calculation according to a pixel value of the found pixel, a pixel value corresponding to the ideal image coordinates of the photographed object.

With reference to the first possible implementation manner of the third aspect of the present disclosure, in a second possible implementation manner, when determining the ideal image coordinates of the photographed object corresponding to the acquired distorted image, the processing module is specifically configured to: create a virtual grid image without an optical distortion, and map the photographed object to the grid image to obtain an ideal image of the photographed object; and determine ideal image coordinates of each grid point in the ideal image.

With reference to the second possible implementation manner of the third aspect of the present disclosure, in a third possible implementation manner, when performing coordinate conversion on the determined ideal image coordinates of the photographed object by using the lens optical distortion model, to obtain the theoretically optically distorted image coordinates corresponding to the ideal image coordinates, the processing module is specifically configured to: read an intrinsic matrix of a terminal device and an inverse matrix of the intrinsic matrix; and for the ideal image coordinates of each grid point in the ideal image, perform: selecting a grid point from the ideal image, and performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates.

With reference to the third possible implementation manner of the third aspect of the present disclosure, in a fourth possible implementation manner, when performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates, the processing module is configured to: convert the ideal image coordinates of the selected grid point into first pinhole plane coordinates by using the inverse matrix of the intrinsic matrix of the terminal device; convert the first pinhole plane coordinates into distorted second pinhole plane coordinates by using the selected lens optical distortion model, where the distorted second pinhole plane coordinates are obtained after the first pinhole plane coordinates corresponding to the selected grid point undergo an optical distortion based on the selected lens optical distortion model; and convert the distorted second pinhole plane coordinates into the theoretically optically distorted image coordinates by using the intrinsic matrix of the terminal device.

With reference to the first possible implementation manner of the third aspect of the present disclosure, or with reference to the second possible implementation manner of the third aspect of the present disclosure, or with reference to the third possible implementation manner of the third aspect of the present disclosure, or with reference to the fourth possible implementation manner of the third aspect of the present disclosure, in a fifth possible implementation manner, when searching, according to the theoretically optically distorted image coordinates and the actually optically distorted image coordinates of the pixels included in the acquired distorted image, for the pixel at which the distance between the actually optically distorted image coordinates and the theoretically optically distorted image coordinates is less than the specified threshold, the processing module is specifically configured to: calculate a distance between the theoretically optically distorted image coordinates and actually optically distorted image coordinates of each pixel included in the acquired distorted image, and determine a corresponding pixel at which the distance obtained by calculation is less than the specified threshold.

With reference to the first possible implementation manner of the third aspect of the present disclosure, or with reference to the second possible implementation manner of the third aspect of the present disclosure, or with reference to the third possible implementation manner of the third aspect of the present disclosure, or with reference to the fourth possible implementation manner of the third aspect of the present disclosure, or with reference to the fifth possible implementation manner of the third aspect of the present disclosure, in a sixth possible implementation manner, when obtaining, by calculation according to the pixel value of the found pixel, the pixel value corresponding to the ideal image coordinates of the photographed object, the processing module is specifically configured to: perform interpolation calculation on the pixel value of the found pixel to obtain the pixel value of the ideal image coordinates of the photographed object in the ideal image.

With reference to the second possible implementation manner of the third aspect of the present disclosure, or with reference to the third possible implementation manner of the third aspect of the present disclosure, or with reference to the fourth possible implementation manner of the third aspect of the present disclosure, or with reference to the fifth possible implementation manner of the third aspect of the present disclosure, or with reference to the sixth possible implementation manner of the third aspect of the present disclosure, in a seventh possible implementation manner, the processing module is configured to: when obtaining a pixel value of each grid point in the ideal image, use the obtained ideal image as the image with the optical distortion of the acquired distorted image corrected.

With reference to the possible implementation manner of the third aspect of the present disclosure, or with reference to the first possible implementation manner of the third aspect of the present disclosure, or with reference to the second possible implementation manner of the third aspect of the present disclosure, or with reference to the third possible implementation manner of the third aspect of the present disclosure, or with reference to the fourth possible implementation manner of the third aspect of the present disclosure, or with reference to the fifth possible implementation manner of the third aspect of the present disclosure, or with reference to the sixth possible implementation manner of the third aspect of the present disclosure, or with reference to the seventh possible implementation manner of the third aspect of the present disclosure, in an eighth possible implementation manner, a mapping relationship between the lens optical distortion model and the reprojection error value includes: selecting a calibration object for a lens optical distortion model; mapping the calibration object to a grid image to obtain ideal image coordinates of the calibration object; converting the obtained ideal image coordinates of the calibration object into theoretically distorted image coordinates by using the lens optical distortion model; mapping the calibration object to an image sensor by using an imaging function of an optical imaging device, to obtain an optically distorted image, and determining actually distorted image coordinates of a pixel in the optically distorted image; determining, according to a difference between the theoretically distorted image coordinates and the actually distorted image coordinates, a reprojection error value corresponding to the lens optical distortion model; and establishing a mapping relationship between the lens optical distortion model and the determined reprojection error value.

With reference to the possible implementation manner of the third aspect of the present disclosure, or with reference to the first possible implementation manner of the third aspect of the present disclosure, or with reference to the second possible implementation manner of the third aspect of the present disclosure, or with reference to the third possible implementation manner of the third aspect of the present disclosure, or with reference to the fourth possible implementation manner of the third aspect of the present disclosure, or with reference to the fifth possible implementation manner of the third aspect of the present disclosure, or with reference to the sixth possible implementation manner of the third aspect of the present disclosure, or with reference to the seventh possible implementation manner of the third aspect of the present disclosure, or with reference to the eighth possible implementation manner of the third aspect of the present disclosure, in a ninth possible implementation manner, when obtaining the image with the optical distortion corrected, the processing module is further configured to: when determining that a specified object is included in the acquired distorted image, determine intensity and a direction of a regional distortion of the specified object in the acquired distorted image; select a regional distortion correction parameter according to the determined intensity and the direction of the regional distortion of the specified object; and correct, by using the selected regional distortion correction parameter, the regional distortion of the image with the optical distortion corrected, to obtain an image with the regional distortion corrected.

With reference to the ninth possible implementation manner of the third aspect of the present disclosure, in a tenth possible implementation manner, when determining the intensity and the direction of the regional distortion of the specified object in the acquired distorted image, the processing module is configured to: determine a first position coordinate set of the specified object in the acquired distorted image, and determine a second position coordinate set of the specified object in the image with the optical distortion corrected; for at least one pixel in the specified object, respectively determine coordinates of the at least one pixel in the first position coordinate set and coordinates of the at least one pixel in the second position coordinate set; and determine the intensity and the direction of the regional distortion of the specified object in the acquired distorted image according to the coordinates of the at least one pixel in the first position coordinate set and the coordinates of the at least one pixel in the second position coordinate set.

With reference to the ninth possible implementation manner of the third aspect of the present disclosure, or with reference to the tenth possible implementation manner of the third aspect of the present disclosure, in an eleventh possible implementation manner, when correcting, by using the selected regional distortion correction parameter, the regional distortion of the image with the optical distortion corrected, to obtain the image with the regional distortion corrected, the processing module is configured to: correct, by using the selected regional distortion correction parameter, coordinates of each pixel included in the first position coordinate set; determine a conversion rule between coordinates of pixels of the specified object in the corrected first position coordinate set and coordinates of the pixels in the second position coordinate set according to the corrected first position coordinate set and the second position coordinate set; and correct, by using the determined conversion rule, the regional distortion of the image with the optical distortion corrected, to obtain the image with the regional distortion corrected.

With reference to the eleventh possible implementation manner of the third aspect of the present disclosure, in a twelfth possible implementation manner, when correcting, by using the determined conversion rule, the regional distortion of the image with the optical distortion corrected, the processing module is specifically configured to: create, according to the image with the optical distortion corrected, a virtual grid image with the regional distortion corrected, where a quantity of grid points included in the grid image with the regional distortion corrected is the same as a quantity of pixels included in the image with the optical distortion corrected, and coordinates of a grid point and coordinates of a pixel in a same position are the same; and for each grid point in the grid image, perform the following operations: selecting a grid point from the grid image, and converting coordinates of the grid point into regionally distorted coordinates by using the determined conversion rule; searching, according to the regionally distorted coordinates and coordinates of the pixels included in the image with the optical distortion corrected, for a pixel at which a distance between coordinates and the regionally distorted coordinates is less than a specified distance; and obtaining a pixel value of the selected grid point in the grid image by calculation according to a pixel value of the found pixel.

In the embodiments of the present disclosure, a distorted image of a photographed object is acquired; a lens optical distortion model whose reprojection error value is less than a specified threshold is selected according to a mapping relationship between at least one group of lens optical distortion models and reprojection error values, where the lens optical distortion model includes an optical distortion type, a distortion order, and a distortion coefficient, and for any calibration object, the reprojection error value is used to represent a difference between theoretically distorted image coordinates of the calibration object and actually distorted image coordinates of the calibration object; and an optical distortion of the acquired distorted image is corrected by using the lens optical distortion model, so that an image with the optical distortion corrected is obtained. In this way, for an acquired distorted image, optical distortion correction is performed by using a lens optical distortion parameter whose reprojection error value is less than a specified threshold, and an optical distortion caused by an optical imaging theory of an imaging device in a process of acquiring an image of a photographed object is eliminated effectively; further, because a reprojection error value corresponding to a selected lens optical distortion model is less than the specified threshold, precision of optical distortion correction is improved, and quality of a photographed image is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
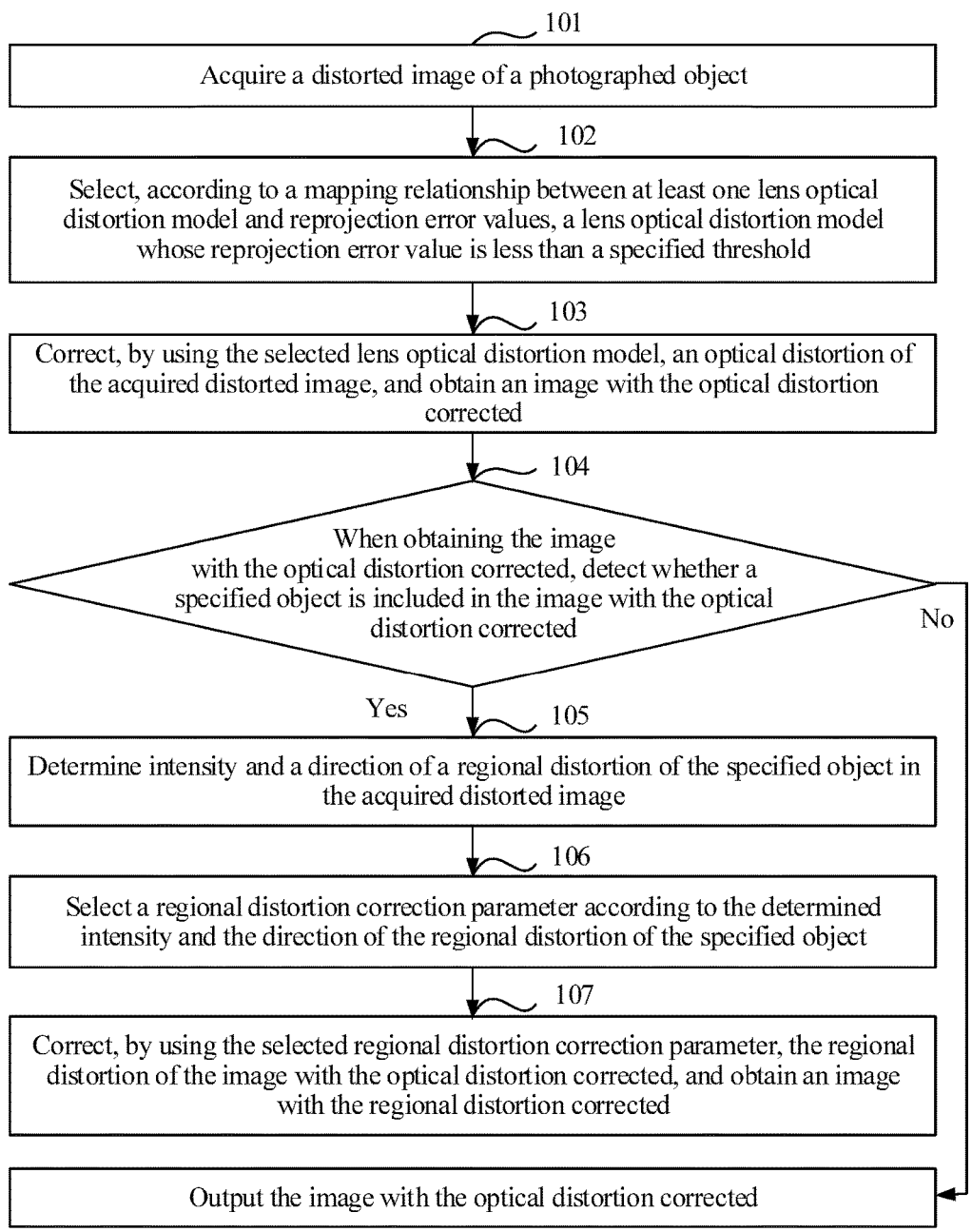
FIG. 1 is a schematic flowchart of an embodiment of an image processing method disclosure.

To achieve objectives of the present disclosure, the embodiments of the present disclosure provide an image processing method and device. For an acquired distorted image, optical distortion correction is performed by using a lens optical distortion parameter whose reprojection error value is less than a specified threshold, and an optical distortion caused by an optical imaging theory of an imaging device in a process of acquiring an image of a photographed object is eliminated effectively; further, because a reprojection error value corresponding to a selected lens optical distortion model is less than the specified threshold, precision of optical distortion correction is improved, and quality of a photographed image is improved.

It should be noted that, spatial coordinates of a photographed object involved in the embodiments of the present disclosure are coordinates of the photographed object in a three-dimensional space. For example, the spatial coordinates may include a longitude, a latitude, and a height.

Ideal image coordinates of the photographed object are undistorted coordinates of each grid point in a grid image to which the photographed object is mapped.

Theoretically distorted image coordinates of the photographed object are coordinates that are obtained after coordinate conversion is performed on the ideal image coordinates of the photographed object by using a lens optical distortion model.

Actually distorted image coordinates of the photographed object are: after the photographed object is mapped to an image sensor by using an imaging function of an optical imaging device, a actually optically distorted image is obtained, where coordinates of each pixel in the actually optically distorted image may be referred to as actually distorted image coordinates of the photographed object.

It should be noted that, one terminal device may locally store multiple lens optical distortion models, where different lens optical distortion models may be determined by using a camera/photography calibration method in some approaches (for example, Zhang Zhengyou camera calibration method or Tsai camera calibration method).

The lens optical distortion model includes an optical distortion type, a distortion order, and a distortion coefficient.

The optical distortion type includes at least one or more of a radial distortion and a tangential distortion.

It should be noted that, the radial distortion is a change of vector endpoints in a length direction; the tangential distortion is a change of vector endpoints in a tangential direction, that is, a change in angles.

It should be noted that, lens optical distortion models locally stored by different terminal devices may be different or may be the same.

That the lens optical distortion models are different may be that the lens optical distortion models include different optical distortion types, or that the lens optical distortion models include a same optical distortion type but different distortion orders.

That the lens optical distortion models are the same is that the lens optical distortion models include a same optical distortion type and a same distortion order. For a same lens optical distortion model, distortion coefficients that are determined by different terminal devices by using the camera/photography calibration method and correspond to the same optical distortion type and same distortion order in the same lens optical distortion model may be the same or may be different.

For example, a lens optical distortion model is expressed as:

$$\begin{cases} x_{rd} = x[1 + K_1 * r^2] \\ y_{rd} = y[1 + K_1 * r^2] \end{cases}$$

where $(x, y)$ are ideal image coordinates of a photographed object; $(x_{rd}, y_{rd})$ are coordinates obtained after the ideal image coordinates of the photographed object are radially distorted; $r$ indicates a polar radius of $(x, y)$; and $K_1$ indicates a radial distortion coefficient. In different terminal devices, the determined $K_1$ may be the same or may be different.

The following describes the embodiments of the present disclosure in detail with reference to accompanying drawings in this specification. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

As shown in FIG. 1, FIG. 1 is a schematic flowchart of an image processing method according to Embodiment 1 of the present disclosure, where the method may be performed by a terminal device. The method includes:

Step 101: Acquire a distorted image of a photographed object.

In step 101, in a phase of acquiring the distorted image of the photographed object, a terminal device maps the photographed object to an image sensor by using an imaging function of an imaging unit, to obtain the distorted image, and the image sensor sends the distorted image obtained by mapping, to a processor of the terminal device.

The terminal device may be a terminal device having a photo shooting function such as a camera, a camcorder, or a mobile phone, and the imaging unit may be a lens in the terminal device.

When the lens converts the photographed object into an image, for an optical reason of lens imaging, and/or due to a spatial distance between the photographed object and the terminal device, the image converted from the photographed object tends to be distorted.

For the optical reason of lens imaging, the image converted from the photographed object tends to be optically distorted.

Step 102: Select, according to a mapping relationship between at least one lens optical distortion model and reprojection error values, a lens optical distortion model whose reprojection error value is less than a specified threshold.

For any calibration object, the reprojection error value refers to a difference between theoretically distorted image coordinates of the calibration object and actually distorted image coordinates of the calibration object.

In other words, if the reprojection error value is smaller, the theoretically distorted image coordinates of the calibration object are nearer to the actually distorted image coordinates of the calibration object, and precision of subsequent optical distortion correction is higher.

It should be noted that, at least one lens optical distortion model may be stored in a memory.

In step 102, the mapping relationship between the at least one lens optical distortion model and the reprojection error values may be obtained by learning the lens optical distortion model.

For example, a lens optical distortion model is selected, and for different calibration objects, reprojection error values corresponding to the lens optical distortion model are calculated respectively, and in this case, a mapping relationship between the lens optical distortion model and multiple reprojection error values obtained by calculation is stored; or an average value of obtained multiple reprojection error values or a numeric value in other forms is determined to be a reprojection error value corresponding to the lens optical distortion model, and a mapping relationship between the lens optical distortion model and the determined reprojection error values is stored.

For a terminal device, multiple lens optical distortion models may be stored.

For example, the lens optical distortion model may be obtained by combining different optical distortion types. The lens optical distortion model is obtained by combining a radial distortion model and a tangential distortion model.

For example, a radial distortion model corresponding to a radial distortion may be:

$$\begin{cases} x_{rd} = x[1 + K_1 * r^2 + K_2 * r^4 + K_3 * r^6 + \ldots + K_i * r^{2i} + \ldots] \\ y_{rd} = y[1 + K_1 * r^2 + K_2 * r^4 + K_3 * r^6 + \ldots + K_i * r^{2i} + \ldots] \end{cases} \quad \text{(formula 1)}$$

where $(x, y)$ are ideal image coordinates of the photographed object; $(x_{rd}, y_{rd})$ are coordinates obtained after the ideal image coordinates of the photographed object are radially distorted; $r$ indicates a polar radius of $(x, y)$; and $K_1$ indicates a radial distortion coefficient, $2i$ in $r^{2i}$ indicates a radial distortion order, and values of $i$ are 1 to N, where N is a positive integer.

A tangential distortion model corresponding to a tangential distortion may be:

$$\begin{cases} x_{pd} = [P_2(r^2 + 2x^2) + 2P_1 xy](1 + P_3 * r^2 + P_4 * r^4 + \ldots) \\ y_{rd} = [P_1(r^2 + 2y^2) + 2P_2 xy](1 + P_3 * r^2 + P_4 * r^4 + \ldots) \end{cases} \quad \text{(formula 2)}$$

where (x, y) are the ideal image coordinates of the photographed object; $(x_{pd}, y_{pd})$ are coordinates obtained after the ideal image coordinates of the photographed object are tangentially distorted; r indicates the polar radius of (x, y); and $P_1, P_2, P_3, P_4, \ldots$ indicate tangential distortion coefficients, and an exponent of r indicates a tangential distortion order.

A lens optical distortion model obtained by combination is:

$$\begin{cases} x_d = x_{rd} + x_{pd} \\ y_d = y_{rd} + y_{pd} \end{cases} ;$$ (formula 3)

where $(x_{rd}, y_{rd})$ are the coordinates obtained after the ideal image coordinates of the photographed object are radially distorted; $(x_{pd}, y_{pd})$ are the coordinates obtained after the ideal image coordinates of the photographed object are tangentially distorted; and $(x_d, y_d)$ are coordinates obtained after the ideal image coordinates of the photographed object undergo a lens optical distortion.

As can be seen, if radial distortion orders are different, and/or tangential distortion orders are different, obtained lens optical distortion models are also different.

Table 1 shows lens optical distortion models obtained by combining radial distortion models and tangential distortion models:

TABLE 1

| Lens optical distortion model No. | Radial distortion model and tangential distortion model corresponding to the lens optical distortion model |
|---|---|
| 1 | Second-order radial distortion model and zeroth-order tangential distortion model |
| 2 | Fourth-order radial distortion model and zeroth-order tangential distortion model |
| 3 | Sixth-order radial distortion model and zeroth-order tangential distortion model |
| 4 | $(2 + 4)^{th}$-order radial distortion model and zeroth-order tangential distortion model |
| 5 | $(2 + 6)^{th}$-order radial distortion model and zeroth-order tangential distortion model |
| 6 | $(4 + 6)^{th}$-order radial distortion model and zeroth-order tangential distortion model |
| 7 | $(2 + 4 + 6)^{th}$-order radial distortion model and zeroth-order tangential distortion model |

Referring to formula 1 and formula 2, understandably, the second-order radial distortion model indicates:

$$\begin{cases} x_{rd} = x[1 + K_1 * r^2] \\ y_{rd} = y[1 + K_1 * r^2] \end{cases}$$

the fourth-order radial distortion model indicates:

$$\begin{cases} x_{rd} = x[1 + K_2 * r^4] \\ y_{rd} = y[1 + K_2 * r^4] \end{cases}$$

the sixth-order radial distortion model indicates:

$$\begin{cases} x_{rd} = x[1 + K_3 * r^6] \\ y_{rd} = y[1 + K_3 * r^6] \end{cases}$$

the $(2+4)^{th}$-order radial distortion model indicates:

$$\begin{cases} x_{rd} = x[1 + K_1 * r^2 + K_2 * r^4] \\ y_{rd} = y[1 + K_1 * r^2 + K_2 * r^4] \end{cases}$$

the $(2+6)^{th}$-order radial distortion model indicates:

$$\begin{cases} x_{rd} = x[1 + K_1 * r^2 + K_3 * r^6] \\ y_{rd} = y[1 + K_1 * r^2 + K_3 * r^6] \end{cases}$$

the $(4+6)^{th}$-order radial distortion model indicates:

$$\begin{cases} x_{rd} = x[1 + K_2 * r^4 + K_3 * r^6] \\ y_{rd} = y[1 + K_2 * r^4 + K_3 * r^6] \end{cases}$$

and the $(2+4+6)^{th}$-order radial distortion model indicates:

$$\begin{cases} x_{rd} = x[1 + K_1 * r^2 + K_2 * r^4 + K_3 * r^6] \\ y_{rd} = y[1 + K_1 * r^2 + K_2 * r^4 + K_3 * r^6] \end{cases} .$$

The zeroth-order tangential distortion model indicates:

$$\begin{cases} x_{pd} = [P_2 2x^2 + 2P_1 xy] \\ y_{rd} = [P_1 2y^2 + 2P_2 xy] \end{cases} .$$

A terminal device determines radial distortion coefficients, tangential distortion coefficients, and polar radii of different lens optical distortion models respectively by using a camera/photography calibration method in some approaches (for example, Zhang Zhengyou camera calibration method or Tsai camera calibration method).

After the radial distortion coefficients, tangential distortion coefficients, and polar radii of different lens optical distortion models are determined, a mapping relationship between the lens optical distortion model and the corresponding reprojection error value may be established in the following manner: selecting a calibration object for a lens optical distortion model; mapping the calibration object to a grid image to obtain ideal image coordinates of the calibration object; converting the obtained ideal image coordinates of the calibration object into theoretically distorted image coordinates by using the lens optical distortion model; mapping the calibration object to an image sensor by using an imaging function of an optical imaging device, to obtain an optically distorted image, and determining actually distorted image coordinates of a pixel in the optically distorted image; determining, according to a difference between the theoretically distorted image coordinates and the actually distorted image coordinates, a reprojection error value corresponding to the lens optical distortion model; and establishing a mapping relationship between the lens optical distortion model and the determined reprojection error value.

It should be noted that, the determining, according to a difference between the theoretically distorted image coordinates and the actually distorted image coordinates, a reprojection error value corresponding to the lens optical distortion model includes: determining that the difference between the theoretically distorted image coordinates and the actually distorted image coordinates is the reprojection error value corresponding to the lens optical distortion model.

It should be noted that, if the calibration object includes multiple points, when differences between theoretically distorted image coordinates and actually distorted image coordinates are calculated, theoretically distorted image coordinates and actually distorted image coordinates that indicate a same point of the calibration object are selected for calculating a difference. An average value or a weighted average value of obtained multiple differences is determined to be the reprojection error value corresponding to the lens optical distortion model.

For example, if a lens optical model includes a second-order radial distortion model and a zeroth-order tangential distortion model, a reprojection error value obtained by calculation is 0.6; if a lens optical model includes a sixth-order radial distortion model and a zeroth-order tangential distortion model, a reprojection error value obtained by calculation is 0.67; if a lens optical model includes a sixth-order radial distortion model and a zeroth-order tangential distortion model, a reprojection error value obtained by calculation is 1.1; if a lens optical model includes a $(2+4)^{th}$-order radial distortion model and a zeroth-order tangential distortion model, a reprojection error value obtained by calculation is 0.51; if a lens optical model includes a $(2+6)^{th}$-order radial distortion model and a zeroth-order tangential distortion model, a reprojection error value obtained by calculation is 0.54; if a lens optical model includes a $(4+6)^{th}$-order radial distortion model and a zeroth-order tangential distortion model, a reprojection error value obtained by calculation is 0.51; if a lens optical model includes a $(2+4+6)^{th}$-order radial distortion model and a zeroth-order tangential distortion model, a reprojection error value obtained by calculation is 0.49.

Figure 2:
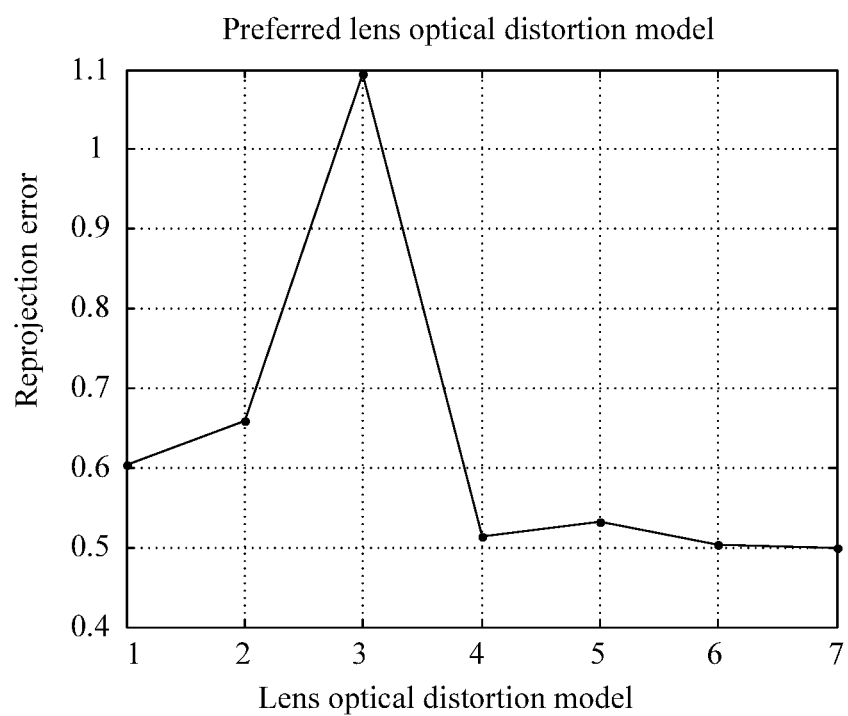
FIG. 2 is a schematic diagram of reprojection error values corresponding to lens optical distortion models.

As shown in FIG. 2, FIG. 2 is a schematic diagram of reprojection error values corresponding to different lens optical distortion models.

If the specified threshold is 0.52, lens optical distortion models whose reprojection error values are less than 0.52 include: a lens optical distortion model obtained by combining the $(2+4)^{th}$-order radial distortion model and the zeroth-order tangential distortion model, namely, a lens optical distortion model 4; a lens optical distortion model obtained by combining the $(4+6)^{th}$-order radial distortion model and the zeroth-order tangential distortion model, namely, a lens optical distortion model 6; and a lens optical distortion model obtained by combining the $(2+4+6)^{th}$-order radial distortion model and the zeroth-order tangential distortion model, namely, a lens optical distortion model 7.

Because the reprojection error value obtained by calculation for the lens optical distortion model 7 is the smallest, the lens optical distortion model 7 may be used as a preferred lens optical distortion model, but complexity of the lens optical distortion model 7 is also the highest. For the reprojection error values corresponding to the lens optical distortion model 4 and the lens optical distortion model 6 that satisfy the condition, the lens optical distortion model 4 or the lens optical distortion model 6 may be preferred in a device having limited computing resources. In this way, correction precision may be sacrificed slightly to reduce calculation complexity.

Optionally, in the embodiment of the present disclosure, the terminal device may further use the photographed object corresponding to the acquired distorted image as the calibration object, respectively calculate reprojection error values corresponding to different lens optical distortion models, and according to the reprojection error values obtained by calculation, select a lens optical distortion model whose reprojection error value is less than the specified threshold or select a lens optical distortion model corresponding to a smallest reprojection error value.

When the photographed object is used as the calibration object, first, actually distorted image coordinates corresponding to the photographed object are determined; next, theoretically distorted image coordinates corresponding to the photographed object are obtained by respectively using different lens optical distortion models; then, a difference between the theoretically distorted image coordinates and the actually distorted image coordinates is calculated, and a reprojection error value corresponding to each lens optical distortion model is obtained; finally, a lens optical distortion model whose reprojection error value is less than the specified threshold is selected, or a lens optical distortion model corresponding to a smallest reprojection error value is selected.

It should be noted that, when the reprojection error value corresponding to each lens optical distortion model is obtained, a mapping relationship between the lens optical distortion model and the corresponding reprojection error value is established and is stored locally, and may be used as a reference basis for subsequently selecting a lens optical distortion model.

Step 103: Correct, by using the selected lens optical distortion model, an optical distortion of the acquired distorted image to obtain an image with the optical distortion corrected.

In step 103, the correcting, by using the lens optical distortion model, an optical distortion of the acquired distorted image includes: determining ideal image coordinates of the photographed object corresponding to the acquired distorted image, where the ideal image coordinates are used to represent coordinates of the photographed object in an image without an optical distortion; performing coordinate conversion on the determined ideal image coordinates of the photographed object by using the lens optical distortion model, to obtain theoretically optically distorted image coordinates corresponding to the ideal image coordinates; searching, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold; and obtaining, by calculation according to a pixel value of the found pixel, a pixel value corresponding to the ideal image coordinates of the photographed object.

First, spatial coordinates of each point included in the photographed object corresponding to the acquired distorted image may be determined, and then ideal image coordinates corresponding to the spatial coordinates of each point are obtained by calculation.

The ideal image coordinates are coordinates of the photographed object in an image without an optical distortion; the spatial coordinates are coordinates of the photographed object in a three-dimensional space.

The ideal image coordinates corresponding to the spatial coordinates of each point may be obtained by calculation in the following manner: creating a virtual grid image without an optical distortion, and mapping the photographed object to the grid image to obtain an ideal image of the photographed object; and determining ideal image coordinates of each grid point in the ideal image.

Next, for the ideal image coordinates of each grid point in the ideal image, the following operations are performed: selecting a grid point from the ideal image, and performing coordinate conversion on the ideal image coordinates of the selected grid point by using the selected lens optical distortion model, to obtain the theoretically optically distorted image coordinates; searching, according to the theoretically optically distorted image coordinates and the actually optically distorted image coordinates of the pixels included in the acquired distorted image, for the pixel at which the distance between the actually optically distorted image coordinates and the theoretically optically distorted image coordinates is less than the specified threshold; and obtaining, by calculation according to the pixel value of the found pixel, the pixel value corresponding to the ideal image coordinates of the photographed object.

The performing coordinate conversion on the ideal image coordinates of the selected grid point by using the selected lens optical distortion model, to obtain the theoretically optically distorted image coordinates includes: reading an intrinsic matrix of a terminal device and an inverse matrix of the intrinsic matrix; and performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates.

The performing coordinate conversion on the ideal image coordinates of the selected grid point to obtain the theoretically optically distorted image coordinates includes:

Step 1: Convert the ideal image coordinates of the selected grid point into first pinhole plane coordinates by using the inverse matrix of the intrinsic matrix of the terminal device.

Step 2: Convert the first pinhole plane coordinates into distorted second pinhole plane coordinates by using the selected lens optical distortion model, where the distorted second pinhole plane coordinates are obtained after the first pinhole plane coordinates corresponding to the selected grid point undergo an optical distortion based on the selected lens optical distortion model.

Step 3: Convert the distorted second pinhole plane coordinates into the theoretically optically distorted image coordinates by using the intrinsic matrix of the terminal device.

It should be noted that, the pinhole plane coordinates are coordinates of a point determined in a coordinate system that is established based on the terminal device.

The coordinate system that is established based on the terminal device includes: an optical center of the imaging unit of the terminal device, used as an origin, an optical axis used as a Z-axis of the coordinate system and vertical to an imaging plane, and a photographing direction used as a positive direction, where an X-axis of the coordinate system is parallel to an x-axis of an image physical coordinate system in the imaging plane, and a Y-axis of the coordinate system is parallel to a y-axis of the image physical coordinate system in the imaging plane.

For example, in step 1, the following manner is used to convert the ideal image coordinates of the selected grid point into the first pinhole plane coordinates corresponding to the selected grid point:

$$\begin{bmatrix} X \\ Y \\ Z \end{bmatrix} = A^{-1} * \begin{bmatrix} x \\ y \\ 1 \end{bmatrix};$$

where (x, y, 1) are homogeneous coordinates corresponding to the ideal image coordinates of the selected grid point; (X, Y, Z) are the first pinhole plane coordinates; and A is an upper triangular matrix of 3*3, indicating an intrinsic matrix output in a calibration process of the terminal device, and $A^{-1}$ is an inverse matrix of A.

It should be noted that, (x, y, 1) are obtained after homogeneous coordinate conversion is performed on (x, y), where (x, y) are the ideal image coordinates of the selected grid point.

For example, in step 2, by using the selected lens optical distortion model, coordinate conversion is performed on the first pinhole plane coordinates to obtain the distorted second pinhole plane coordinates.

It is assumed that the selected lens optical distortion model is the lens optical distortion model 4 in Table 1, where a radial distortion model is;

$$\begin{cases} x_{rd} = x[1 + K_1 * r^2 + K_2 * r^4] \\ y_{rd} = y[1 + K_1 * r^2 + K_2 * r^4] \end{cases}; \quad \text{(formula 4)}$$

a tangential distortion model is:

$$\begin{cases} x_{pd} = [P_2 2x^2 + 2P_1 xy] \\ y_{rd} = [P_1 2y^2 + 2P_2 xy] \end{cases}; \quad \text{(formula 5)}$$

and a lens optical distortion model obtained by combination is:

$$\begin{cases} x_d = x_{rd} + x_{pd} \\ y_d = y_{rd} + y_{pd} \end{cases}. \quad \text{(formula 6)}$$

The first pinhole plane coordinates are substituted into formula 4 and formula 5 respectively. A result obtained by calculation from formula 4 and a result obtained by calculation from formula 5 are substituted into formula 6, and the distorted second pinhole plane coordinates are obtained by calculation.

For example, in step 3, the following manner is used to convert the distorted second pinhole plane coordinates into the theoretically optically distorted image coordinates:

$$\begin{bmatrix} x_d \\ y_d \\ z_d \end{bmatrix} = A * \begin{bmatrix} X_d \\ Y_d \\ 1 \end{bmatrix};$$

where ($x_d$, $y_d$, $z_d$) are the theoretically optically distorted image coordinates; and ($X_d$, $Y_d$, 1) are the distorted second pinhole plane coordinates.

It should be noted that, $(X_d, Y_d, 1)$ are homogeneous coordinates of $(X_d, Y_d)$, obtained by calculation in step 2.

Homogeneous coordinate conversion is a manner of using an n+1-dimensional vector to indicate an n-dimensional vector.

The searching, according to the theoretically optically distorted image coordinates and the actually optically distorted image coordinates of the pixels included in the acquired distorted image, for the pixel at which the distance between the actually optically distorted image coordinates and the theoretically optically distorted image coordinates is less than the specified threshold includes: calculating a distance between the theoretically optically distorted image coordinates and actually optically distorted image coordinates of each pixel included in the acquired distorted image, and determining a corresponding pixel at which the distance obtained by calculation is less than the specified threshold.

The obtaining, by calculation according to the pixel value of the found pixel, the pixel value corresponding to the ideal image coordinates of the photographed object includes: performing interpolation calculation on the pixel value of the found pixel to obtain the pixel value of the selected grid point in the ideal image.

For example, $(x_d, y_d)$ are theoretically optically distorted image coordinates, and pixels at which distances between the actually optically distorted image coordinates and the theoretically optically distorted image coordinates are less than the specified threshold are found and expressed as follows by using the actually optically distorted image coordinates: (x1, y1), (x2, y2), (x3, y3), and (x4, y4); therefore, the pixel value corresponding to the selected grid point (x, y) in the ideal image can be obtained after interpolation calculation is performed on a pixel value of (x1, y1), a pixel value of (x2, y2), a pixel value of (x3, y3), and a pixel value of (x4, y4).

It should be noted that, an interpolation calculation method may adopt bilinear interpolation, or may adopt bicubic interpolation, or may adopt a more complex interpolation method based on edge statistics information, which is not specifically limited herein.

When a pixel value of each grid point in the ideal image is obtained, the obtained ideal image is used as the image with the optical distortion of the acquired distorted image corrected.

Step 104: When obtaining the image with the optical distortion corrected, detect whether a specified object is included in the image with the optical distortion corrected; if the specified object is included, perform step 105; otherwise, output the image with the optical distortion corrected.

In step 104, the specified object may be a facial feature image, an image of a certain specific object, or the like, which is not limited herein.

Step 105: Determine intensity and a direction of a regional distortion of the specified object in the acquired distorted image.

The direction of the regional distortion of the specified object in the acquired distorted image includes: the specified object moves from a center of the acquired distorted image to edges of the acquired distorted image, or the specified object moves from edges of the acquired distorted image to a center of the acquired image.

The intensity of the regional distortion of the specified object in the acquired distorted image includes: one or more of a displacement value and a displacement variation.

It should be noted that, the regional distortion may be that an image obtained by conversion is distorted due to the spatial distance between the photographed object and the terminal device or a shooting angle in a process of converting the photographed object into the image by using the imaging function of the optical imaging unit.

The determining intensity and a direction of a regional distortion of the specified object in the acquired distorted image in step 105 includes:

Step 1: Determine a first position coordinate set of the specified object in the acquired distorted image, and determine a second position coordinate set of the specified object in the image with the optical distortion corrected.

For example, if the specified object is facial features, pixels that belong to the facial features are determined in the acquired image, and coordinates of the determined pixels that belong to the facial features are collected to obtain the first position coordinate set; pixels that belong to the facial features are determined in the image with the optical distortion corrected, and coordinates of the determined pixels that belong to the facial features are collected to obtain the second position coordinate set.

It should be noted that, the coordinates of the pixels of the facial features included in the first position coordinate set and the second position coordinate set may be coordinates of all pixels of the photographed object that indicate the facial features, or may be coordinates of some pixels that indicate the facial features. The coordinates of the pixels of the facial features, included in the first position coordinate set, and the coordinates of the pixels of the facial features, included in the second position coordinate set, may satisfy that facial features indicated by the pixels of the facial features are the same. For example, pixels indicating a facial feature eye in the photographed object are numbered 1-10. If the first position coordinate set includes coordinates of a No. 1 pixel indicating the facial feature eye, the second position coordinate set also includes coordinates of the No. 1 pixel indicating the facial feature eye.

Step 2: For at least one pixel in the specified object, respectively determine coordinates of the at least one pixel in the first position coordinate set and coordinates of the at least one pixel in the second position coordinate set.

For example, the coordinates of the No. 1 pixel indicating the facial feature eye, included in the first position coordinate set, are (a, b); the coordinates of the No. 1 pixel indicating the facial feature eye, included in the second position coordinate set, are (c, d).

Step 3: Determine the intensity and the direction of the regional distortion of the specified object in the acquired distorted image according to the coordinates of the at least one pixel in the first position coordinate set and the coordinates of the at least one pixel in the second position coordinate set.

For example, a vector from (a, b) to (c, d) is calculated, where a positive or negative sign of the vector indicates a direction of a regional distortion of the No. 1 pixel indicating the facial feature eye in the acquired image, and a value of the vector indicates intensity of the regional distortion of the No. 1 pixel indicating the facial feature eye in the acquired distorted image.

For example, if it is determined, according to the first position coordinate set of the specified object in the acquired distorted image, that the specified object is in four corners of the acquired distorted image, and that the direction of the regional distortion of the specified object in the acquired distorted image is moving from the center of the acquired distorted image to the edges of the acquired distorted image, a change of a distortion speed is: first increasing, and then decreasing.

From a perspective of relative motion, when the specified object is in a region with the speed increasing in the acquired distorted image, the specified object is stretched toward four corners, causing the intensity of the regional distortion of the specified object to increase; when the specified object is in a region with the speed decreasing in the acquired distorted image, the specified object is compressed toward the center, causing the intensity of the regional distortion of the specified object to decrease.

Figure 3A:
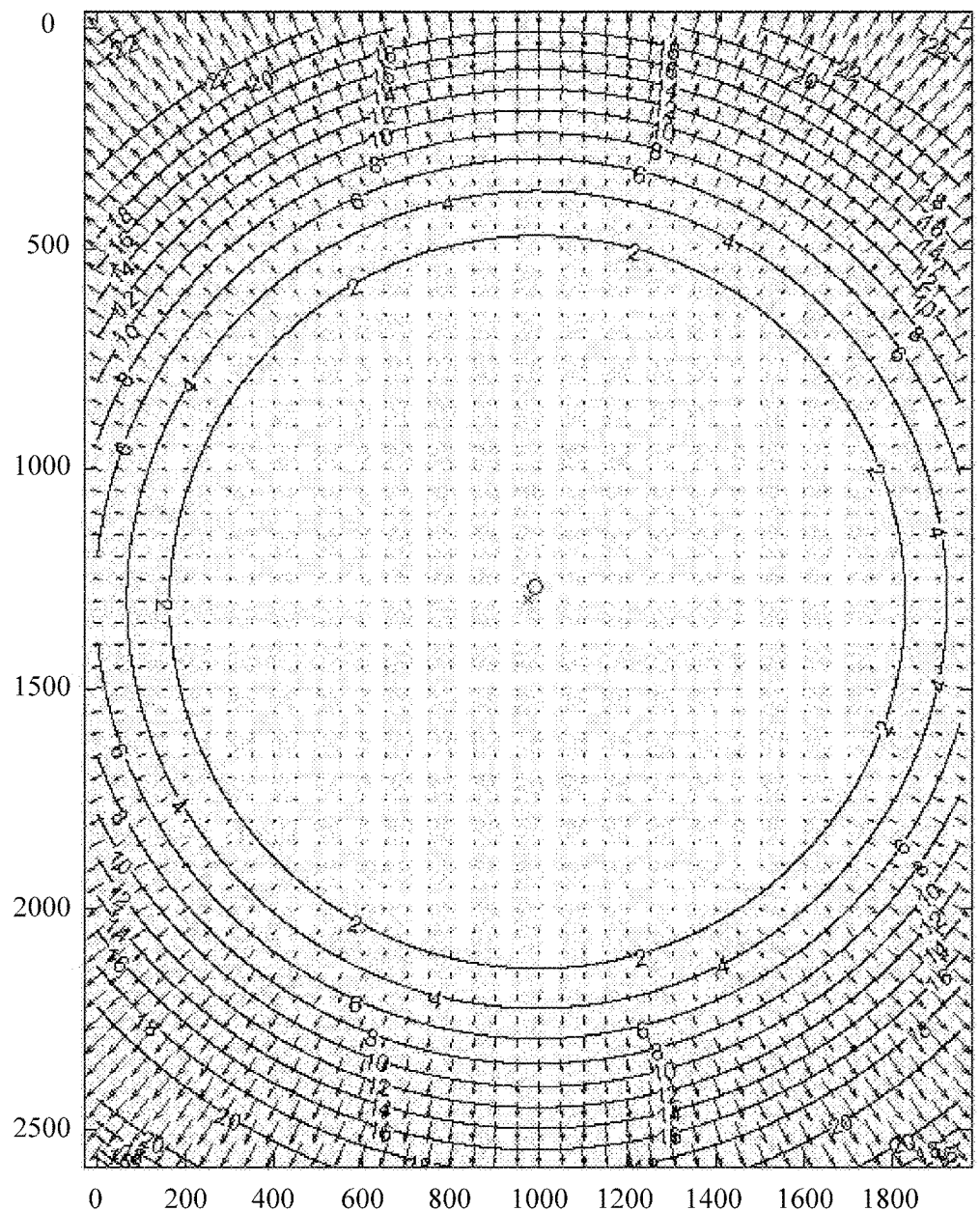
FIG. 3A is a normal chart of a displacement vector of an image in optical distortion correction.

As shown in FIG. 3A, FIG. 3A is a normal chart of a displacement vector of the image in optical distortion correction.

Figure 3B:
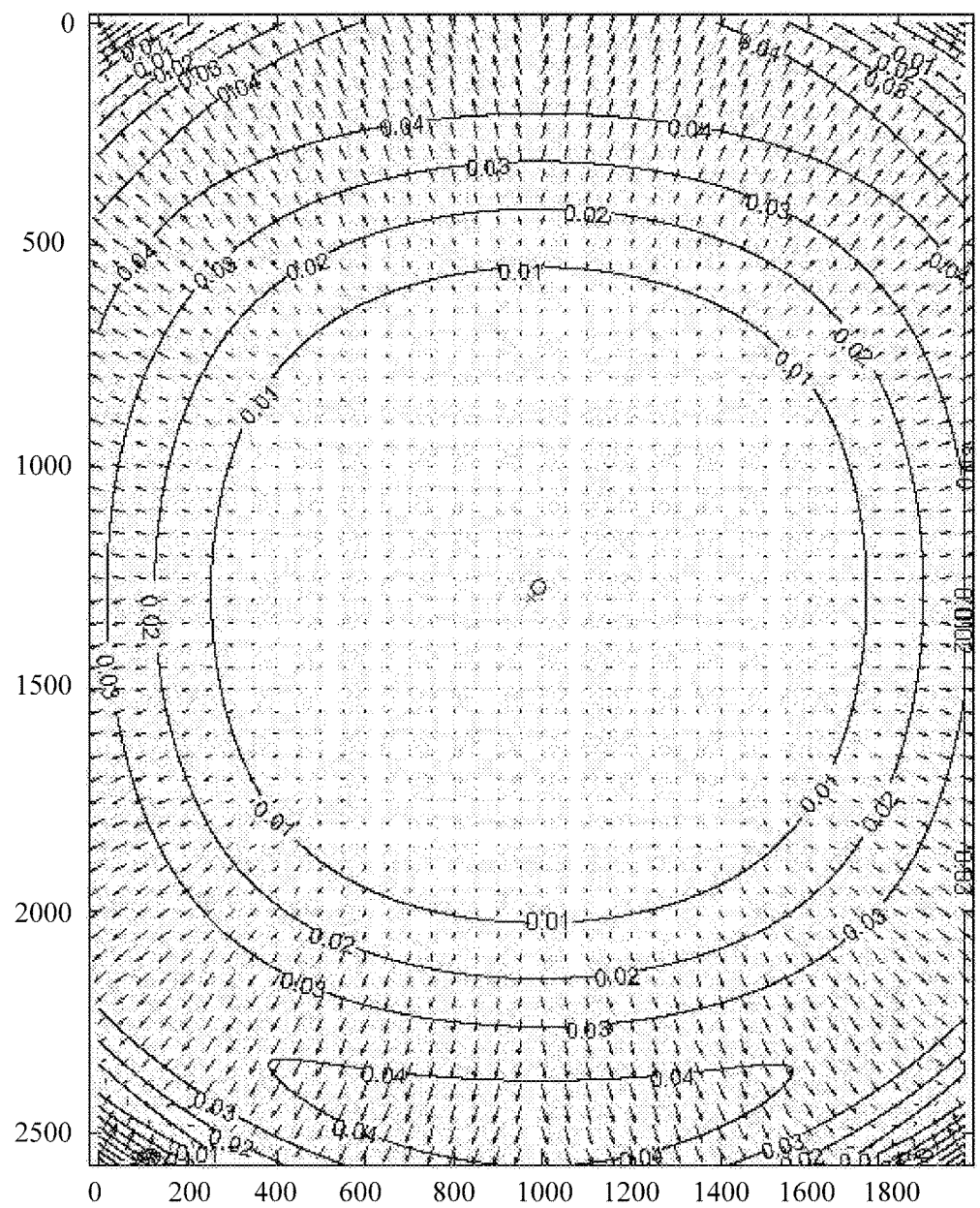
FIG. 3B is a change chart of a displacement vector of an image in optical distortion correction.

As shown in FIG. 3B, FIG. 3B is a change chart of the displacement vector of the image in optical distortion correction.

Step 106: Select a regional distortion correction parameter according to the determined intensity and the direction of the regional distortion of the specified object.

The regional distortion correction parameter may be used to describe a direction of regional distortion correction and intensity of regional distortion correction.

In step 106, the regional distortion correction parameter corresponding to the determined intensity and the direction of the regional distortion of the specified object is obtained according to a mapping relationship between the intensity and the direction of the regional distortion and the regional distortion correction parameter.

It should be noted that, the mapping relationship between the intensity and the direction of the regional distortion and the regional distortion correction parameter may be obtained by learning.

Step 107: Correct, by using the selected regional distortion correction parameter, the regional distortion of the image with the optical distortion corrected, to obtain an image with the regional distortion corrected.

The correcting, by using the selected regional distortion correction parameter, the regional distortion of the image with the optical distortion corrected in step 107 includes:

Step 1: Correct, by using the selected regional distortion correction parameter, coordinates of each pixel included in the first position coordinate set.

For example, a pixel is selected from the first position coordinate set, and coordinates of the selected pixel are corrected in the following manner:

$$F_d{}^! = alpha*(F_d - F_{ldc}) + F_{ldc};$$

where $F_d{}^!$ is corrected coordinates of the selected pixel, $F_{ldc}$ is coordinates of the selected pixel in the second position coordinate set, $F_d$ is coordinates of the selected pixel in the first position coordinate set before the correction, and alpha is a regional distortion correction parameter including a regional distortion direction and regional distortion intensity.

Step 2: Determine a conversion rule between coordinates of pixels of the specified object in the corrected first position coordinate set and coordinates of the pixels in the second position coordinate set according to the corrected first position coordinate set and the second position coordinate set.

For example, a pixel is selected from the corrected first position coordinate set, homogeneous coordinates corresponding to coordinates of the pixel are determined to be $(x_1, y_1, z_1)$ and homogeneous coordinates corresponding to coordinates of the pixel in the second position coordinate set are determined to be $(x_2, y_2, z_2)$.

A homography matrix H describes a spatial conversion relationship of coordinates corresponding to a same pixel in $F_d{}^!$ and $F_{ldc}$, that is, $$\begin{bmatrix} x_2 \\ y_2 \\ z_2 \end{bmatrix} = H^* \begin{bmatrix} x_1 \\ y_1 \\ z_1 \end{bmatrix}$$

where $$H = \begin{bmatrix} H_{11} & H_{12} & H_{13} \\ H_{21} & H_{22} & H_{23} \\ H_{31} & H_{32} & H_{33} \end{bmatrix}.$$

It should be noted that $$H = \begin{bmatrix} H_{11} & H_{12} & H_{13} \\ H_{21} & H_{22} & H_{23} \\ H_{31} & H_{32} & H_{33} \end{bmatrix}$$

indicates a homography matrix, where the homography matrix is a 3*3 matrix.

The following is obtained by further expansion:

$$x_2'(H_{31}x_1 + H_{32}y_1 + H_{33}) = H_{11}x_1 + H_{12}y_1 + H_{13}$$

$$y_2'(H_{31}x_1 + H_{32}y_1 + H_{33}) = H_{21}x_1 + H_{22}y_1 + H_{23},$$

$$x_2' = x_2/z_2$$

where $y_2' = y_2/z_2$.

Bh=0 is obtained by further collation, where $h = (H_{11}, H_{12}, H_{13}, H_{21}, H_{22}, H_{23}, H_{31}, H_{32}, H_{33})^T$ and $$B = \begin{pmatrix} b_{x_1}^T \\ b_{y_1}^T \\ \vdots \\ b_{x_M}^T \\ b_{y_M}^T \end{pmatrix}$$

$$b_x = (-x_1, -y_1, -1, 0, 0, 0, x_2'x_1, x_2'y_1, x_2')^T$$

$$b_y = (0, 0, 0, -x_1, -y_1, -1, y_2'x_1, y_2'y_1, y_2')^T,$$

and M is a quantity of pixel pairs included in $\{F_d{}^!, F_{ldc}\}$.

For Bh=0, a least square method or a gradient descent method may be used to obtain h, and further, the homography matrix H is obtained, where the homography matrix H represents the conversion rule between the coordinates of the pixels of the specified object in the corrected first position coordinate set and the coordinates of the pixels in the second position coordinate set.

Step 3: Correct, by using the determined conversion rule, the regional distortion of the image with the optical distortion corrected, to obtain the image with the regional distortion corrected.

The correcting the regional distortion of the image with the optical distortion corrected, to obtain the image with the regional distortion corrected includes: first creating, according to the image with the optical distortion corrected, a virtual grid image with the regional distortion corrected, where a quantity of grid points included in the grid image with the regional distortion corrected is the same as a quantity of pixels included in the image with the optical distortion corrected, and coordinates of a grid point and coordinates of a pixel in a same position are the same; and next, for each grid point in the grid image, performing the following operations: selecting a grid point from the grid image, and converting coordinates of the grid point into regionally distorted coordinates by using the determined conversion rule; searching, according to the regionally distorted coordinates and coordinates of the pixels included in the image with the optical distortion corrected, for a pixel at which a distance between coordinates and the regionally distorted coordinates is less than a specified distance; and obtaining a pixel value of the selected grid point in the grid image by calculation according to a pixel value of the found pixel.

The converting coordinates of the grid point into regionally distorted coordinates by using the determined conversion rule includes:

$$\begin{pmatrix} x'_2 \\ y'_2 \\ z'_2 \end{pmatrix} = H^{-1} * \begin{pmatrix} x_1 \\ y_1 \\ 1 \end{pmatrix}$$

$x_2 = x'_2/z'_2,$ and $y_2 = y'_2/z'_2,$ where $(x_1, y_1)$ are the coordinates of the selected grid point, $H^{-1}$ is an inverse matrix of the homography matrix, and $(x_2, y_2)$ are the regionally distorted coordinates.

The obtaining a pixel value of the selected grid point in the grid image by calculation according to a pixel value of the found pixel includes: performing interpolation calculation on the pixel value of the found pixel to obtain the pixel value of the selected grid point in the grid image.

When a pixel value in an image without a regional distortion is obtained for each grid point in the grid image, combination is performed to obtain an image with the optical distortion and regional distortion of the acquired distorted image corrected.

Optionally, the method further includes: after the image with the optical distortion and regional distortion of the acquired distorted image corrected is obtained, the method may further include: displaying and adjusting the obtained image by using a display parameter, so that a resolution of the obtained image is the same as an image resolution of the terminal device, and outputting an adjusted image.

It should be noted that, the display parameter may include a display size, a display resolution, or the like.

In the solution of Embodiment 1 of the present disclosure, a distorted image of a photographed object is acquired; a lens optical distortion model whose reprojection error value is less than a specified threshold is selected according to a mapping relationship between at least one group of lens optical distortion models and reprojection error values, where the lens optical distortion model includes an optical distortion type, a distortion order, and a distortion coefficient, and for any calibration object, the reprojection error value is used to represent a difference between theoretically distorted image coordinates of the calibration object and actually distorted image coordinates of the calibration object; and an optical distortion of the acquired distorted image is corrected by using the lens optical distortion model, so that an image with the optical distortion corrected is obtained. In this way, for an acquired distorted image, optical distortion correction is performed by using a lens optical distortion parameter whose reprojection error value is less than a specified threshold, and an optical distortion caused by an optical imaging theory of an imaging device in a process of acquiring an image of a photographed object is eliminated effectively; further, because a reprojection error value corresponding to a selected lens optical distortion model is less than the specified threshold, precision of optical distortion correction is improved, and quality of a photographed image is improved.

Figure 4:
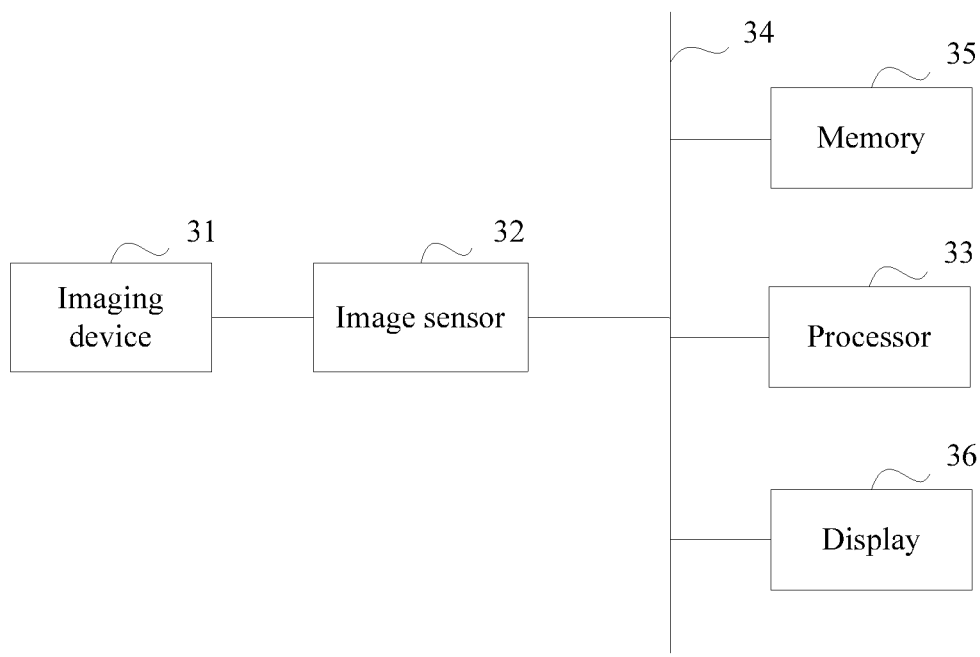
FIG. 4 is a schematic structural diagram of an embodiment of an image processing device disclosure.

As shown in FIG. 4, FIG. 4 is a schematic structural diagram of an image processing device according to Embodiment 2 of the present disclosure. The image processing device has functions of Embodiment 1 of the present disclosure. Functions of the image processing device may be implemented by using a general-purpose computer. The image processing device includes an imaging device 31, an image sensor 32, and a processor 33. The image sensor 32 and the processor 33 are connected by a bus 34.

The imaging device 31 is configured to map a photographed object to the image sensor 32.

The image sensor 32 is configured to acquire a distorted image.

The processor 33 is configured to select, according to a mapping relationship between at least one group of lens optical distortion models and reprojection error values, a lens optical distortion model whose reprojection error value is less than a specified threshold, where the lens optical distortion model includes an optical distortion type, a distortion order, and a distortion coefficient, and for any calibration object, the reprojection error value is used to represent a difference between theoretically distorted image coordinates of the calibration object and actually distorted image coordinates of the calibration object; and correct, by using the lens optical distortion model, an optical distortion of the distorted image acquired by the image sensor 32, to obtain an image with the optical distortion corrected.

Further, the image processing device may include a memory 35, where the memory 35 and the processor 33 are connected by the bus 34.

The memory 34 is configured to store the distorted image acquired by the image sensor 32.

The memory 34 is further configured to send the stored distorted image to the processor 33.

Further, the image processing device may further include a display 36, where the display 36 and the processor 33 are connected by the bus 34.

The display 36 is configured to output and display the image with the optical distortion corrected, obtained by the processor 33.

When correcting, by using the lens optical distortion model, the optical distortion of the acquired distorted image, the processor 33 is configured to: determine ideal image coordinates of the photographed object corresponding to the acquired distorted image, where the ideal image coordinates are used to represent coordinates of the photographed object in an image without an optical distortion; perform coordinate conversion on the determined ideal image coordinates of the photographed object by using the lens optical distortion model, to obtain theoretically optically distorted image coordinates corresponding to the ideal image coordinates; search, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold; and obtain, by calculation according to a pixel value of the found pixel, a pixel value corresponding to the ideal image coordinates of the photographed object.

When determining the ideal image coordinates of the photographed object corresponding to the acquired distorted image, the processor 33 is configured to: create a virtual grid image without an optical distortion, and map the photographed object to the grid image to obtain an ideal image of the photographed object; and determine ideal image coordinates of each grid point in the ideal image.

When performing coordinate conversion on the determined ideal image coordinates of the photographed object by using the lens optical distortion model, to obtain the theoretically optically distorted image coordinates corresponding to the ideal image coordinates, the processor 33 is configured to: read an intrinsic matrix of the image processing device and an inverse matrix of the intrinsic matrix from the memory 35; and for the ideal image coordinates of each grid point in the ideal image, perform: selecting a grid point from the ideal image, and performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates.

When performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates, the processor 33 is specifically configured to: convert the ideal image coordinates of the selected grid point into first pinhole plane coordinates by using the inverse matrix of the intrinsic matrix of the terminal device; convert the first pinhole plane coordinates into distorted second pinhole plane coordinates by using the selected lens optical distortion model, where the distorted second pinhole plane coordinates are obtained after the first pinhole plane coordinates corresponding to the selected grid point undergo an optical distortion based on the selected lens optical distortion model; and convert the distorted second pinhole plane coordinates into the theoretically optically distorted image coordinates by using the intrinsic matrix of the terminal device.

When searching, according to the theoretically optically distorted image coordinates and the actually optically distorted image coordinates of the pixels included in the acquired distorted image, for the pixel at which the distance between the actually optically distorted image coordinates and the theoretically optically distorted image coordinates is less than the specified threshold, the processor 33 is specifically configured to: calculate a distance between the theoretically optically distorted image coordinates and actually optically distorted image coordinates of each pixel included in the acquired distorted image, and determine a corresponding pixel at which the distance obtained by calculation is less than the specified threshold.

When obtaining, by calculation according to the pixel value of the found pixel, the pixel value corresponding to the ideal image coordinates of the photographed object, the processor 33 is configured to: perform interpolation calculation on the pixel value of the found pixel to obtain the pixel value of the ideal image coordinates of the photographed object in the ideal image.

The processor 33 is specifically configured to: when obtaining a pixel value of each grid point in the ideal image, use the obtained ideal image as the image with the optical distortion of the acquired distorted image corrected.

A mapping relationship between the lens optical distortion model and the reprojection error value includes: selecting a calibration object for a lens optical distortion model; mapping the calibration object to a grid image to obtain ideal image coordinates of the calibration object; converting the obtained ideal image coordinates of the calibration object into theoretically distorted image coordinates by using the lens optical distortion model; mapping the calibration object to the image sensor by using an imaging function of an optical imaging device, to obtain an optically distorted image, and determining actually distorted image coordinates of a pixel in the optically distorted image; determining, according to a difference between the theoretically distorted image coordinates and the actually distorted image coordinates, a reprojection error value corresponding to the lens optical distortion model; and establishing a mapping relationship between the lens optical distortion model and the determined reprojection error value.

Optionally, when obtaining the image with the optical distortion corrected, the processor 33 is further configured to: when determining that a specified object is included in the acquired distorted image, determine intensity and a direction of a regional distortion of the specified object in the acquired distorted image; select a regional distortion correction parameter according to the determined intensity and the direction of the regional distortion of the specified object; and correct, by using the selected regional distortion correction parameter, the regional distortion of the image with the optical distortion corrected, to obtain an image with the regional distortion corrected.

When determining the intensity and the direction of the regional distortion of the specified object in the acquired distorted image, the processor 33 is configured to: determine a first position coordinate set of the specified object in the acquired distorted image, and determine a second position coordinate set of the specified object in the image with the optical distortion corrected; for at least one pixel in the specified object, respectively determine coordinates of the at least one pixel in the first position coordinate set and coordinates of the at least one pixel in the second position coordinate set; and determine the intensity and the direction of the regional distortion of the specified object in the acquired distorted image according to the coordinates of the at least one pixel in the first position coordinate set and the coordinates of the at least one pixel in the second position coordinate set.

When correcting, by using the selected regional distortion correction parameter, the regional distortion of the image with the optical distortion corrected, to obtain the image with the regional distortion corrected, the processor 33 is specifically configured to: correct, by using the selected regional distortion correction parameter, coordinates of each pixel included in the first position coordinate set; determine a conversion rule between coordinates of pixels of the specified object in the corrected first position coordinate set and coordinates of the pixels in the second position coordinate set according to the corrected first position coordinate set and the second position coordinate set; and correct, by using the determined conversion rule, the regional distortion of the image with the optical distortion corrected, to obtain the image with the regional distortion corrected.

When correcting, by using the determined conversion rule, the regional distortion of the image with the optical distortion corrected, the processor 33 is configured to: create, according to the image with the optical distortion corrected, a virtual grid image with the regional distortion corrected, where a quantity of grid points included in the grid image with the regional distortion corrected is the same as a quantity of pixels included in the image with the optical distortion corrected, and coordinates of a grid point and coordinates of a pixel in a same position are the same; and for each grid point in the grid image, perform the following operations: selecting a grid point from the grid image, and converting coordinates of the grid point into regionally distorted coordinates by using the determined conversion rule; searching, according to the regionally distorted coordinates and coordinates of the pixels included in the image with the optical distortion corrected, for a pixel at which a distance between coordinates and the regionally distorted coordinates is less than a specified distance; and obtaining a pixel value of the selected grid point in the grid image by calculation according to a pixel value of the found pixel.

The display 36 is further configured to display the image with the regional distortion corrected.

The processor 33 may be a general-purpose central processing unit (CPU), a microprocessor, an application-specific integrated circuit (ASIC), or one or more integrated circuits for controlling program execution in the solution of the present disclosure.

The memory 35 may be a read-only memory (ROM) or other types of static storage devices capable of storing static information and instructions, or a random access memory (RAM) or other types of dynamic storage devices capable of storing information and instructions, or may be an electrically erasable programmable read-only memory (EEPROM), a compact disc read-only memory (CD-ROM), or other optical disc storages (including a compact disc, a laser disc, an optical disc, a digital versatile disc, a Blu-ray disc, and the like), a magnetic disk storage medium, or other magnetic storage devices, or any other medium that can be used to carry or store expected program code having an instruction or a data structure form and can be accessed by a computer, which is not limited. The memories are connected to the processor by the bus.

For a distorted image, the image processing device not only corrects, by using a lens optical distortion model, an optical distortion caused by a lens device, but also corrects, by using a regional distortion correction parameter, a regional distortion caused by a shooting angle. Therefore, quality of an image captured by a capturing device is improved.

Figure 5:
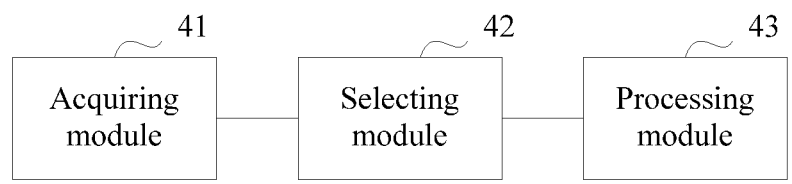
FIG. 5 is a schematic structural diagram of an embodiment of an image processing device disclosure.

As shown in FIG. 5, FIG. 5 is a schematic structural diagram of an image processing device according to Embodiment 3 of the present disclosure. The image processing device includes an acquiring module 41, a selecting module 42, and a processing module 43.

The acquiring module 41 is configured to acquire a distorted image of a photographed object.

The selecting module 42 is configured to select, according to a mapping relationship between at least one group of lens optical distortion models and reprojection error values, a lens optical distortion model whose reprojection error value is less than a specified threshold, where the lens optical distortion model includes an optical distortion type, a distortion order, and a distortion coefficient, and for a calibration object, the reprojection error value is used to represent a difference between theoretically distorted image coordinates of the calibration object and actually distorted image coordinates of the calibration object.

The processing module 43 is configured to correct an optical distortion of the acquired distorted image by using the lens optical distortion model and obtain an image with the optical distortion corrected.

When correcting, by using the lens optical distortion model, the optical distortion of the acquired distorted image, the processing module 43 is configured to: determine ideal image coordinates of the photographed object corresponding to the acquired distorted image, where the ideal image coordinates are used to represent coordinates of the photographed object in an image without an optical distortion; perform coordinate conversion on the determined ideal image coordinates of the photographed object by using the lens optical distortion model, to obtain theoretically optically distorted image coordinates corresponding to the ideal image coordinates; search, according to the theoretically optically distorted image coordinates and actually optically distorted image coordinates of pixels included in the acquired distorted image, for a pixel at which a distance between actually optically distorted image coordinates and the theoretically optically distorted image coordinates is less than a specified threshold; and obtain, by calculation according to a pixel value of the found pixel, a pixel value corresponding to the ideal image coordinates of the photographed object.

When determining the ideal image coordinates of the photographed object corresponding to the acquired distorted image, the processing module 43 is configured to: create a virtual grid image without an optical distortion, and map the photographed object to the grid image to obtain an ideal image of the photographed object; and determine ideal image coordinates of each grid point in the ideal image.

When performing coordinate conversion on the determined ideal image coordinates of the photographed object by using the lens optical distortion model, to obtain the theoretically optically distorted image coordinates corresponding to the ideal image coordinates, the processing module 43 is configured to: read an intrinsic matrix of a terminal device and an inverse matrix of the intrinsic matrix; and for the ideal image coordinates of each grid point in the ideal image, perform: selecting a grid point from the ideal image, and performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates.

When performing coordinate conversion on the ideal image coordinates of the selected grid point by using the intrinsic matrix of the terminal device, the selected lens optical distortion model, and the inverse matrix of the intrinsic matrix of the terminal device, to obtain the theoretically optically distorted image coordinates, the processing module 43 is specifically configured to: convert the ideal image coordinates of the selected grid point into first pinhole plane coordinates by using the inverse matrix of the intrinsic matrix of the terminal device; convert the first pinhole plane coordinates into distorted second pinhole plane coordinates by using the selected lens optical distortion model, where the distorted second pinhole plane coordinates are obtained after the first pinhole plane coordinates corresponding to the selected grid point undergo an optical distortion based on the selected lens optical distortion model; and convert the distorted second pinhole plane coordinates into the theoretically optically distorted image coordinates by using the intrinsic matrix of the terminal device.

When searching, according to the theoretically optically distorted image coordinates and the actually optically distorted image coordinates of the pixels included in the acquired distorted image, for the pixel at which the distance between the actually optically distorted image coordinates and the theoretically optically distorted image coordinates is less than the specified threshold, the processing module 43 is specifically configured to: calculate a distance between the theoretically optically distorted image coordinates and actually optically distorted image coordinates of each pixel included in the acquired distorted image, and determine a corresponding pixel at which the distance obtained by calculation is less than the specified threshold.

When obtaining, by calculation according to the pixel value of the found pixel, the pixel value corresponding to the ideal image coordinates of the photographed object, the processing module 43 is specifically configured to: perform interpolation calculation on the pixel value of the found pixel to obtain the pixel value of the ideal image coordinates of the photographed object in the ideal image.

The processing module 43 is specifically configured to: when obtaining a pixel value of each grid point in the ideal image, use the obtained ideal image as the image with the optical distortion of the acquired distorted image corrected.

Optionally, a mapping relationship between the lens optical distortion model and the reprojection error value includes: selecting a calibration object for a lens optical distortion model; mapping the calibration object to a grid image to obtain ideal image coordinates of the calibration object; converting the obtained ideal image coordinates of the calibration object into theoretically distorted image coordinates by using the lens optical distortion model; mapping the calibration object to an image sensor by using an imaging function of an optical imaging device, to obtain an optically distorted image, and determining actually distorted image coordinates of a pixel in the optically distorted image; determining, according to a difference between the theoretically distorted image coordinates and the actually distorted image coordinates, a reprojection error value corresponding to the lens optical distortion model; and establishing a mapping relationship between the lens optical distortion model and the determined reprojection error value.

Optionally, when obtaining the image with the optical distortion corrected, the processing module 43 is further configured to: when determining that a specified object is included in the acquired distorted image, determine intensity and a direction of a regional distortion of the specified object in the acquired distorted image; select a regional distortion correction parameter according to the determined intensity and the direction of the regional distortion of the specified object; and correct, by using the selected regional distortion correction parameter, the regional distortion of the image with the optical distortion corrected, to obtain an image with the regional distortion corrected.

When determining the intensity and the direction of the regional distortion of the specified object in the acquired distorted image, the processing module 43 is specifically configured to: determine a first position coordinate set of the specified object in the acquired distorted image, and determine a second position coordinate set of the specified object in the image with the optical distortion corrected; for at least one pixel in the specified object, respectively determine coordinates of the at least one pixel in the first position coordinate set and coordinates of the at least one pixel in the second position coordinate set; and determine the intensity and the direction of the regional distortion of the specified object in the acquired distorted image according to the coordinates of the at least one pixel in the first position coordinate set and the coordinates of the at least one pixel in the second position coordinate set.

When correcting, by using the selected regional distortion correction parameter, the regional distortion of the image with the optical distortion corrected, to obtain the image with the regional distortion corrected, the processing module 43 is configured to: correct, by using the selected regional distortion correction parameter, coordinates of each pixel included in the first position coordinate set; determine a conversion rule between coordinates of pixels of the specified object in the corrected first position coordinate set and coordinates of the pixels in the second position coordinate set according to the corrected first position coordinate set and the second position coordinate set; and correct, by using the determined conversion rule, the regional distortion of the image with the optical distortion corrected, to obtain the image with the regional distortion corrected.

When correcting, by using the determined conversion rule, the regional distortion of the image with the optical distortion corrected, the processing module 43 is specifically configured to: create, according to the image with the optical distortion corrected, a virtual grid image with the regional distortion corrected, where a quantity of grid points included in the grid image with the regional distortion corrected is the same as a quantity of pixels included in the image with the optical distortion corrected, and coordinates of a grid point and coordinates of a pixel in a same position are the same; and for each grid point in the grid image, perform the following operations: selecting a grid point from the grid image, and converting coordinates of the grid point into regionally distorted coordinates by using the determined conversion rule; searching, according to the regionally distorted coordinates and coordinates of the pixels included in the image with the optical distortion corrected, for a pixel at which a distance between coordinates and the regionally distorted coordinates is less than a specified distance; and obtaining a pixel value of the selected grid point in the grid image by calculation according to a pixel value of the found pixel.

For a distorted image, the image processing device not only corrects, by using a lens optical distortion model, an optical distortion caused by a lens device, but also corrects, by using a regional distortion correction parameter, a regional distortion caused by a shooting angle. Therefore, quality of an image captured by a capturing device is improved.

The image processing device in Embodiment 3 of the present disclosure may be a logical component integrated in a terminal device, and implemented by hardware or software; or may be a device independent of a terminal device, which is not limited herein.

A person skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. An image processing method, comprising:
acquiring a distorted image of a photographed object;
selecting, according to a mapping relationship between at least one group of lens optical distortion models and reprojection error values, a lens optical distortion model corresponding to a lowest reprojection error value, the lens optical distortion models comprising a respective optical distortion type, a respective distortion order, and a respective distortion coefficient, each of the reprojection error values representing a difference between theoretically distorted image coordinates of a calibration object in a theoretically distorted image corresponding to a respective model of the at least one group of lens optical distortion models, and sensor-mapped distorted image coordinates of the calibration object that are obtained by mapping the calibration object to an image sensor of an optical imaging device;
correcting, using the selected lens optical distortion model, an optical distortion of the distorted image of the photographed object; and
creating an image with the optical distortion corrected.

2. The method of claim 1, wherein correcting the optical distortion comprises:
determining ideal image coordinates of the photographed object corresponding to the acquired distorted image, wherein the ideal image coordinates represent coordinates of the photographed object in an image without an optical distortion;
performing coordinate conversion on the ideal image coordinates using the selected lens optical distortion model to obtain theoretically optically distorted image coordinates corresponding to the ideal image coordinates;
searching, according to the theoretically optically distorted image coordinates corresponding to the ideal image coordinates and sensor-mapped optically distorted image coordinates of pixels in the acquired distorted image of the photographed object, for a pixel at which a distance between the sensor-mapped optically distorted image coordinates of pixels in the acquired distorted image of the photographed object and the theoretically optically distorted image coordinates corresponding to the ideal image coordinates is less than a specified threshold; and
determining, according to the found pixel, a pixel value corresponding to the ideal image coordinates of the photographed object.

3. The method of claim 2, wherein determining the ideal image coordinates comprises:
creating a virtual grid image without an optical distortion;
mapping the photographed object to the virtual grid image to obtain an ideal image of the photographed object; and
determining ideal image coordinates of each grid point in the ideal image.

4. The method of claim 3, wherein performing the coordinate conversion on the ideal image coordinates comprises:
reading an intrinsic matrix of a terminal device and an inverse matrix of the intrinsic matrix; and
for the ideal image coordinates of each grid point in the ideal image:
selecting a grid point from the ideal image; and
performing coordinate conversion on the ideal image coordinates of the selected grid point using the intrinsic matrix, the selected lens optical distortion model, and the inverse matrix, to obtain the theoretically optically distorted image coordinates corresponding to the ideal image coordinates.

5. The method of claim 4, wherein performing the coordinate conversion on the ideal image coordinates of the selected grid point comprises:
converting the ideal image coordinates of the selected grid point into first pinhole plane coordinates using the inverse matrix;
converting the first pinhole plane coordinates into distorted second pinhole plane coordinates using the selected lens optical distortion model, wherein the first pinhole plane coordinates corresponding to the selected grid point undergo an optical distortion based on the selected lens optical distortion model; and
converting the distorted second pinhole plane coordinates into the theoretically optically distorted image coordinates corresponding to the ideal image coordinates using the intrinsic matrix.

6. The method of claim 3, wherein creating the image with the optical distortion corrected comprises using the obtained ideal image as the image with the optical distortion of the distorted image corrected.

7. The method of claim 2, wherein searching for the pixel at which the distance between the sensor-mapped optically distorted image coordinates of pixels in the acquired distorted image of the photographed object and the theoretically optically distorted image coordinates corresponding to the ideal image coordinates is less than the specified threshold comprises:

calculating a distance between the theoretically optically distorted image coordinates corresponding to the ideal image coordinates and the sensor-mapped optically distorted image coordinates of each pixel of the acquired distorted image of the photographed object; and determining a corresponding pixel at which the distance is less than the specified threshold.

8. The method of claim 2, wherein obtaining the pixel value corresponding to the ideal image coordinates of the photographed object comprises performing interpolation calculation on the pixel value of the found pixel to obtain the pixel value of the ideal image coordinates of the photographed object in the ideal image.

9. The method of claim 1, further comprising determining the mapping relationship between the at least one group of lens optical distortion models and the reprojection error values by, for each of the respective lens optical distortion models:

mapping the calibration object to a grid image to obtain ideal image coordinates of the calibration object;

converting, using the respective lens optical distortion model, the obtained ideal image coordinates of the calibration object into theoretically distorted image coordinates corresponding to the respective lens optical distortion model;

mapping the calibration object to the image sensor using an the imaging function of the optical imaging device to obtain a sensor-mapped optically distorted image;

determining the sensor-mapped distorted image coordinates by determining coordinates of one or more pixels in the sensor-mapped optically distorted image;

determining, according to a difference between the theoretically distorted image coordinates corresponding to the respective lens optical distortion model and the sensor-mapped distorted image coordinates, a reprojection error value corresponding to the respective lens optical distortion model; and establishing a mapping relationship between the respective lens optical distortion model and the reprojection error value corresponding to the respective lens optical distortion model.

10. The method of claim 1, further comprising:

determining intensity and a direction of a regional distortion of a detected object in the acquired distorted image;

selecting a regional distortion correction parameter according to the intensity and the direction of the regional distortion of the detected object;

correcting, using the selected regional distortion correction parameter, the regional distortion of the image; and creating an image with the regional distortion corrected.

11. An image processing device, comprising:

an image sensor;

an imaging device configured to map a photographed object to the image sensor, wherein the image sensor is configured to acquire a distorted image of the photographed object; and a processor coupled to the image sensor and the imaging device and configured to:

select, according to a mapping relationship between at least one group of lens optical distortion models and reprojection error values, a lens optical distortion model corresponding to a lowest reprojection error value, the lens optical distortion models comprising a respective optical distortion type, a respective distortion order, and a respective distortion coefficient, each of the reprojection error values representing a difference between theoretically distorted image coordinates of a calibration object in a theoretically distorted image corresponding to a respective model of the at least one group of lens optical distortion models, and sensor-mapped distorted image coordinates of the calibration object that are obtained by mapping the calibration object to the image sensor;

correct, using the selected lens optical distortion model, an optical distortion of the acquired distorted image; and create an image with the optical distortion corrected.

12. The image processing device of claim 11, wherein the processor being configured to correct the optical distortion of the acquired distorted image comprises the processor being configured to:

determine ideal image coordinates of the photographed object corresponding to the acquired distorted image, wherein the ideal image coordinates represent coordinates of the photographed object in an image without an optical distortion;

perform coordinate conversion on the ideal image coordinates using the selected lens optical distortion model to obtain theoretically optically distorted image coordinates corresponding to the ideal image coordinates;

search, according to the theoretically optically distorted image coordinates corresponding to the ideal image coordinates and sensor-mapped optically distorted image coordinates of pixels in the acquired distorted image, for a pixel at which a distance between the sensor-mapped optically distorted image coordinates and the theoretically optically distorted image coordinates corresponding to the ideal image coordinates is less than a specified threshold; and determine, according to the found pixel, a pixel value corresponding to the ideal image coordinates of the photographed object.

13. The image processing device of claim 12, wherein the processor being configured to determine the ideal image coordinates comprises the processor being configured to:

create a virtual grid image without an optical distortion;

map the photographed object to the virtual grid image to obtain an ideal image of the photographed object; and determine ideal image coordinates of each grid point in the ideal image.

14. The image processing device of claim 13, wherein the processor being configured to perform coordinate conversion on the ideal image coordinates comprises the processor being configured to:

read an intrinsic matrix of a terminal device and an inverse matrix of the intrinsic matrix; and for the ideal image coordinates of each grid point in the ideal image:
  select a grid point from the ideal image; and
  perform coordinate conversion on the ideal image coordinates of the selected grid point using the intrinsic matrix, the selected lens optical distortion model, and the inverse matrix to obtain the theoretically optically distorted image coordinates corresponding to the ideal image coordinates.

15. The image processing device of claim 14, wherein the processor being configured to perform coordinate conversion on the ideal image coordinates of the selected grid point comprises the processor being configured to:
  convert the ideal image coordinates of the selected grid point into first pinhole plane coordinates using the inverse matrix;
  convert the first pinhole plane coordinates into distorted second pinhole plane coordinates using the selected lens optical distortion model, wherein the first pinhole plane coordinates corresponding to the selected grid point undergo an optical distortion based on the selected lens optical distortion model; and
  convert the distorted second pinhole plane coordinates into the theoretically optically distorted image coordinates corresponding to the ideal image coordinates using the intrinsic matrix.

16. The image processing device of claim 12, wherein the processor being configured to search for the pixel at which the distance between the sensor-mapped optically distorted image coordinates of pixels in the acquired distorted image and the theoretically optically distorted image coordinates corresponding to the ideal image coordinates is less than the specified threshold comprises the processor being configured to:
  calculate a distance between the theoretically optically distorted image coordinates corresponding to the ideal image coordinates and sensor-mapped optically distorted image coordinates of each pixel of the acquired distorted image; and
  determine a corresponding pixel at which the distance is less than the specified threshold.

17. The image processing device of claim 12, wherein the processor being configured to obtain the pixel value corresponding to the ideal image coordinates of the photographed object comprises the processor being configured to perform interpolation calculation on the pixel value of the found pixel to obtain the pixel value of the ideal image coordinates of the photographed object in the ideal image.

18. The image processing device of claim 12, wherein the processor is further configured to use the obtained ideal image as the image with the optical distortion of the distorted image corrected when obtaining the pixel value of each grid point in the ideal image.

19. The image processing device of claim 11, wherein the processor is further configured to determine the mapping relationship between the at least one group of lens optical distortion models and the reprojection error values by being configured to, for each of the respective lens optical distortion models:
  map the calibration object to a grid image to obtain ideal image coordinates of the calibration object;
  convert, using the respective lens optical distortion model, the obtained ideal image coordinates of the calibration object into theoretically distorted image coordinates corresponding to the respective lens optical distortion model;
  map the calibration object to the image sensor using an imaging function of an optical imaging device to obtain a sensor-mapped optically distorted image;
  determine the sensor-mapped distorted image coordinates by determining coordinates of one or more pixels in the sensor-mapped optically distorted image;
  determine, according to a difference between the theoretically distorted image coordinates corresponding to the respective lens optical distortion model and the sensor-mapped distorted image coordinates, a reprojection error value corresponding to the respective lens optical distortion model; and
  establish a mapping relationship between the respective lens optical distortion model and the reprojection error value corresponding to the respective lens optical distortion model.

20. The image processing device of claim 11, wherein the processor is further configured to:
  determine intensity and a direction of a regional distortion of a detected object in the acquired distorted image;
  select a regional distortion correction parameter according to the intensity and the direction of the regional distortion of the detected object;
  correct, using the selected regional distortion correction parameter, the regional distortion of the image; and
  create an image with the regional distortion corrected.

* * * * *